(12) United States Patent
Laftchiev et al.

(10) Patent No.: US 11,472,028 B2
(45) Date of Patent: Oct. 18, 2022

(54) SYSTEMS AND METHODS AUTOMATIC ANOMALY DETECTION IN MIXED HUMAN-ROBOT MANUFACTURING PROCESSES

(71) Applicant: Mitsubishi Electric Research Laboratories, Inc., Cambridge, MA (US)

(72) Inventors: Emil Laftchiev, Cambridge, MA (US); Diego Romeres, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 198 days.

(21) Appl. No.: 16/705,602

(22) Filed: Dec. 6, 2019

(65) Prior Publication Data
US 2021/0170590 A1 Jun. 10, 2021

(51) Int. Cl.
B25J 9/16 (2006.01)

(52) U.S. Cl.
CPC ............ B25J 9/1653 (2013.01); B25J 9/163 (2013.01); B25J 9/1676 (2013.01)

(58) Field of Classification Search
CPC ........ B25J 9/1653; B25J 9/163; B25J 9/1676; B25J 9/1674; Y02P 90/02;
(Continued)

(56) References Cited

U.S. PATENT DOCUMENTS 10,955,811 B2 * 3/2021 Nagarajan ............ G06K 7/0004
2015/0206090 A1 * 7/2015 Pakhchanyan ... G06Q 10/06398
705/7.42
(Continued)

FOREIGN PATENT DOCUMENTS

JP 2011227773 11/2011

OTHER PUBLICATIONS

A. E. Frank, A. Kubota and L. D. Riek, "Wearable activity recognition for robust human-robot teaming in safety-critical environments via hybrid neural networks," 2019 IEEE/RSJ International Conference on Intelligent Robots and Systems (IROS), U.S. Appl. No. 11/082,019, pp. 449-454 (Year: 2019).*

*Primary Examiner* — Abbyy Lin
*Assistant Examiner* — Danielle Marie Jackson
(74) *Attorney, Agent, or Firm* — Gennadiy Vinokur; Hironori Tsukamoto

(57) ABSTRACT

A system for detecting an anomaly in an execution of a task in mixed human-robot processes. Receiving human worker (HW) signals and robot signals. A processor to extract from the HW signals, task information, measurements relating to a state of the HW, and input into a Human Performance (HP) model, to obtain a state of the HW based on previously learned boundaries of the state of the HW, the state of the HW is then inputted into a Human-Robot Interaction (HRI) model, to determine a classification of an anomaly or no anomaly. Update HRI model with robot operation signals, HW signals and classified anomaly, determine a control action of a robot interacting with the HW or a type of an anomaly alarm using the updated HRI model and classified anomaly. Output the control action of the robot to change a robot action or output the type of the anomaly alarm.

20 Claims, 15 Drawing Sheets

(58) Field of Classification Search
CPC .... G05B 2219/32358; G05B 19/41865; G05B 2219/40414; G05B 2219/40202; G05B 2219/40499
See application file for complete search history.

(56) References Cited

U.S. PATENT DOCUMENTS

| | | | |
|---|---|---|---|
| 2016/0031084 A1* | 2/2016 | Yamazaki | B25J 9/0087 |
| | | | 901/19 |
| 2016/0260027 A1* | 9/2016 | Kuwabara | G06N 7/005 |
| 2018/0056520 A1* | 3/2018 | Ozaki | B25J 9/1653 |
| 2018/0346256 A1* | 12/2018 | Kurihara | B65G 47/905 |
| 2019/0105779 A1* | 4/2019 | Einav | B25J 9/1689 |
| 2019/0139441 A1* | 5/2019 | Akella | G06K 9/4628 |
| 2020/0097076 A1* | 3/2020 | Alcaide | G02B 27/0093 |
| 2021/0034062 A1* | 2/2021 | Ahn | A47L 11/4061 |
| 2021/0146546 A1* | 5/2021 | Linkowski | B25J 9/1694 |

* cited by examiner

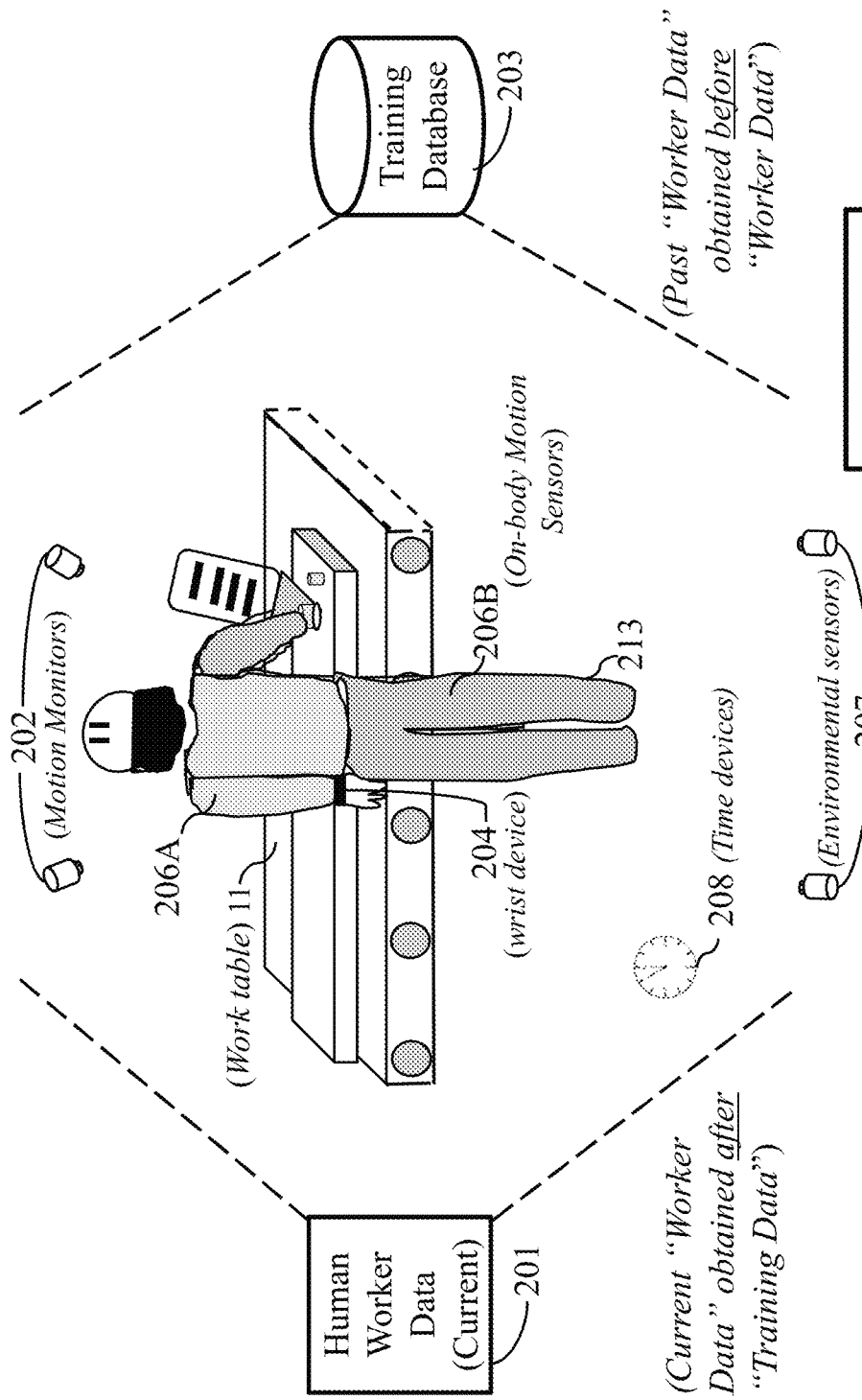

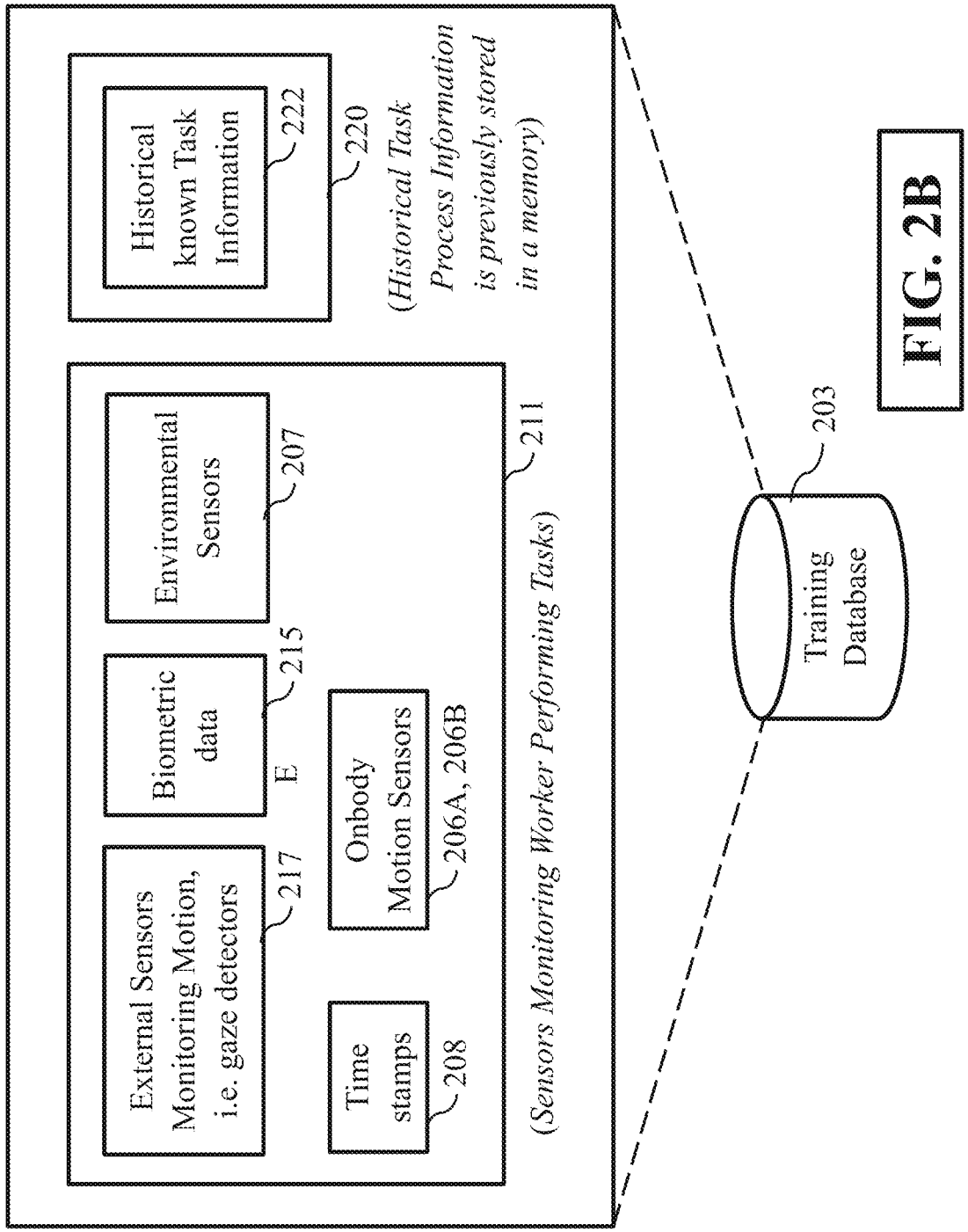

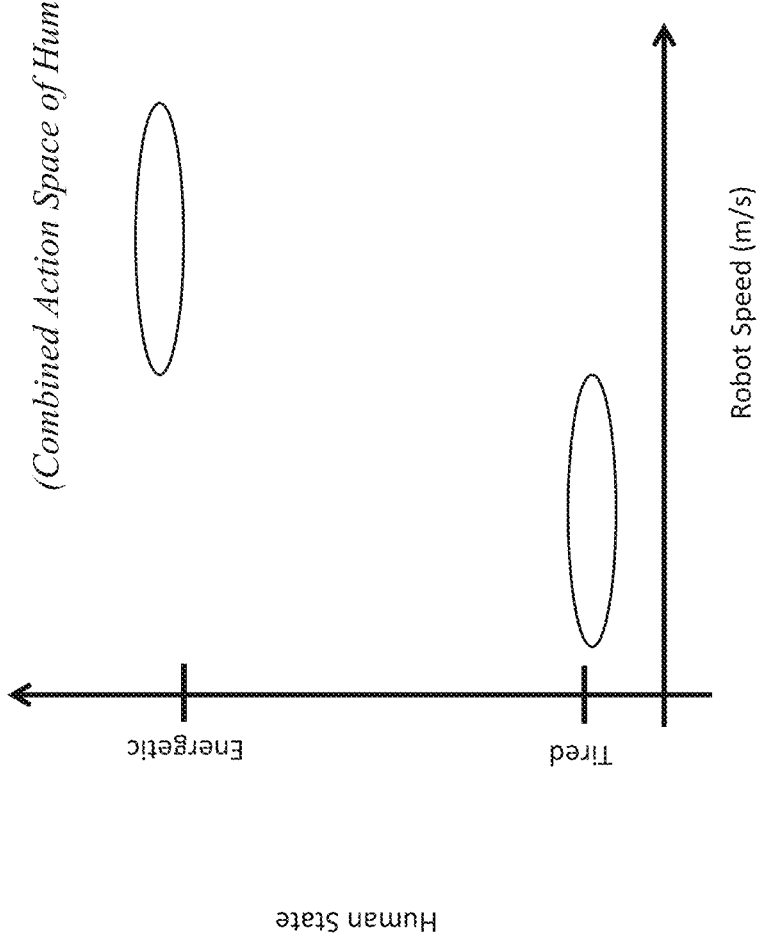

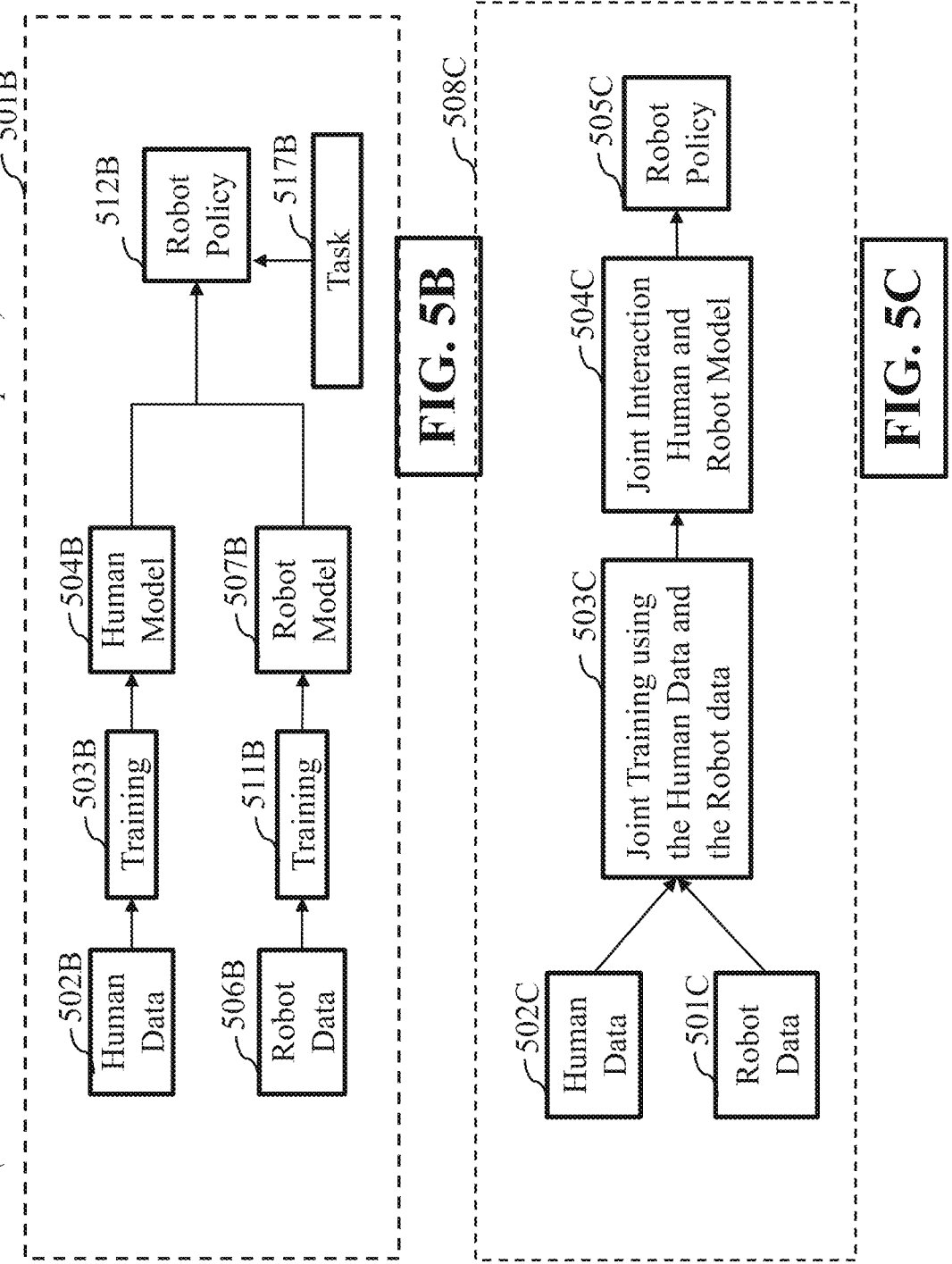

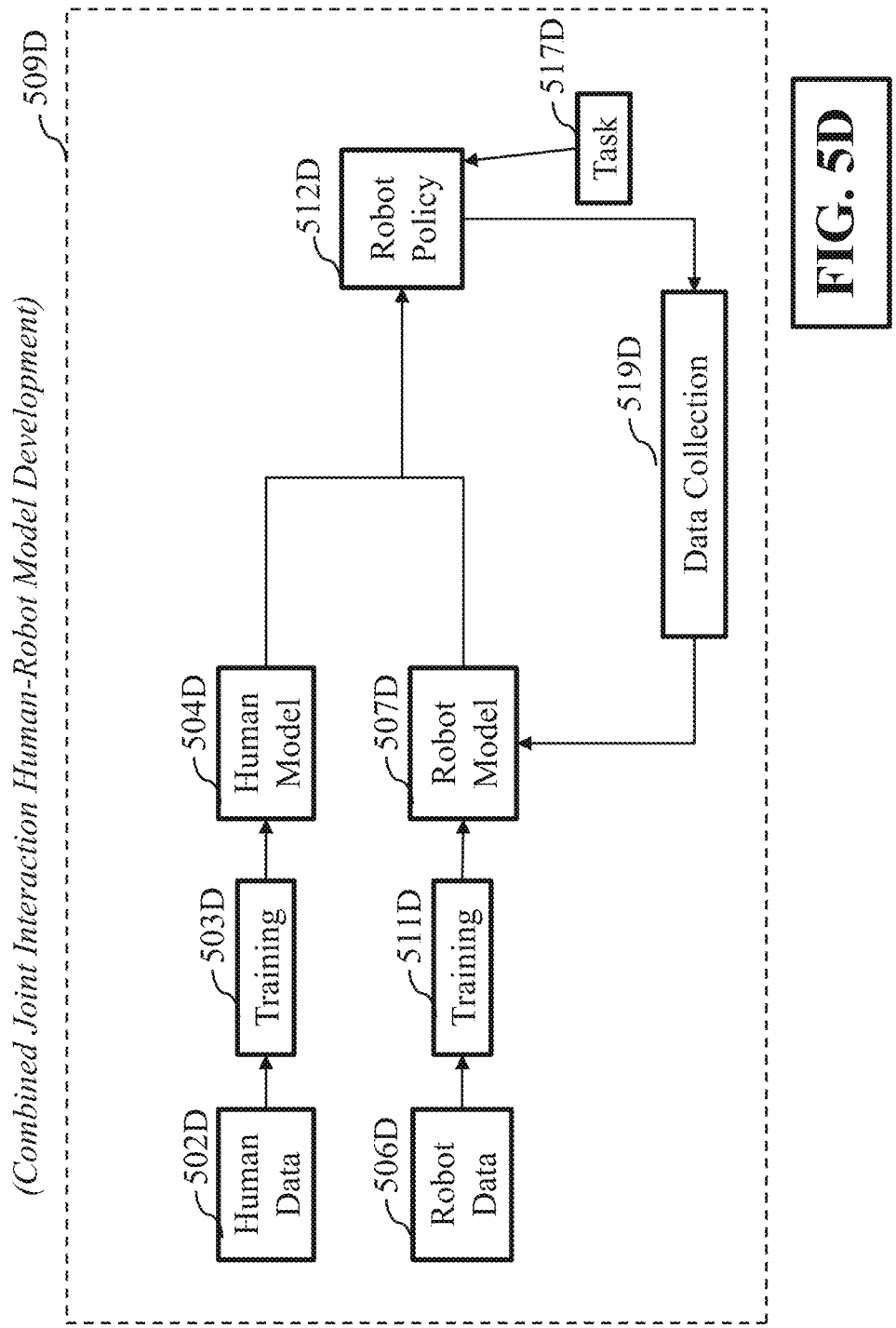

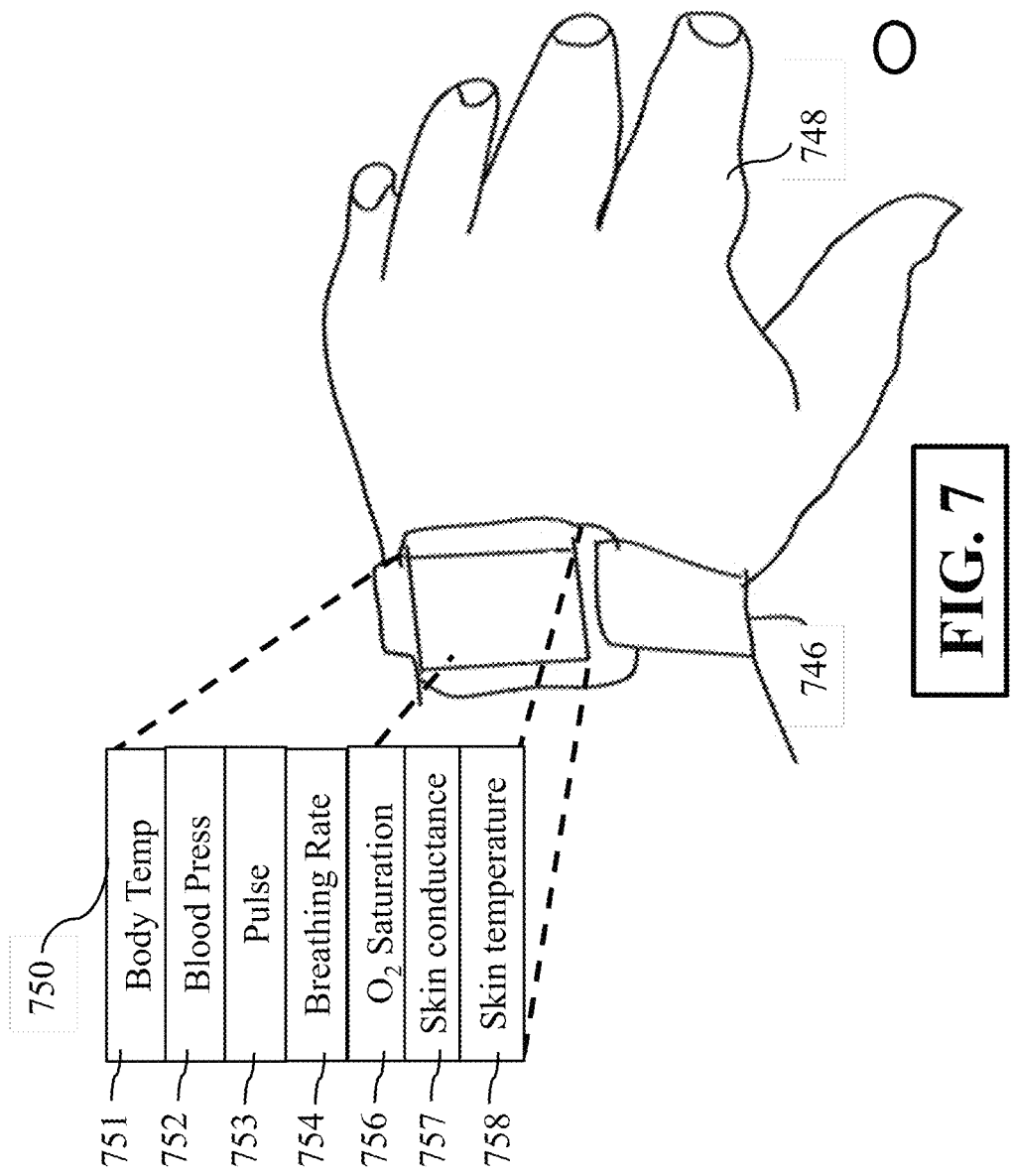

SYSTEMS AND METHODS AUTOMATIC ANOMALY DETECTION IN MIXED HUMAN-ROBOT MANUFACTURING PROCESSES

FIELD

The present disclosure relates generally to systems and methods of model learning technologies, and more specifically to systems and designs of model learning technologies for joint human-robot manufacturing processes.

BACKGROUND

Conventional machine learning technologies can allow intelligent systems such as robots and personal assistants to acquire knowledge and solve difficult problems by learning from examples or instruction.

However, there are many difficulties with these conventional learning models to control robotic systems in the fact that the motion of a robotic system is governed by very complex physical laws, called Rigid Body Dynamics (RBD) and only a crude representation of these physical laws are usually known. Moreover, measurements of physical quantities need to compute these laws, such as position, velocity and acceleration of each component of the robot, which often is unavailable. Sensors mounted on the robotic systems typically only measure a position component (e.g. encoders, potentiometers, proximity sensors . . . ), while velocity and acceleration are not measured. Moreover, when a task involves the manipulation of a certain object it is often the case that the object is sensor-less and only external sensors can be added to measure its position on the space e.g., cameras or encoders.

Other problems with these conventional learning models to control robotic systems is that developments in wearable technology and machine learning are not accounted for, or for that matter included. When these conventional machine-learning approaches are used, it tends to be from a subfield of computer vision, which poses a significant list of limitations in terms of applicability of a solution. For example, CN105389859A patent relates to a monitoring system for monitoring a sanitation worker at a working state. This method is based on intelligent lamppost applications, that uses RFID and smart lampposts to monitor worker attendance. However, this these methods do not learn what the worker is doing and what the state of health of the worker might be.

Accordingly, there is a need to develop advanced technologies for learning systems that learn to characterize a joint human-robot manufacturing process. In particular, there is a need to provide learning systems designed to optimize the process at a human-robot collaboration level that adjusts help that a robot can provide to a human worker, subject to a condition of the human worker. In addition, a system capable of detecting anomalies in a total manufacturing process.

SUMMARY

The present disclosure relates generally to systems and methods of model learning technologies, and more specifically to systems and designs of model learning technologies for joint human-robot manufacturing processes.

In particular, some systems and methods of the present disclosure overcome the conventional human-robot collaboration process problems by optimizing speed along the total manufacturing process, and optimizing the interaction between the human and robot to optimize speed and quality of the product. This can be accomplished by optimizing the process at the human-robot collaboration level by adjusting the help that the robot is providing to the human worker subject to the condition of the worker, along with being capable of detecting anomalies in the total manufacturing process while taking into account the variation of conditions possible of the human worker.

For example, some embodiments include initially learning the typical or normal operation of a human worker performance, i.e. determining the typical motions performed by the human worker and the levels of alertness or fatigue experienced by the worker. Learning a personalized task execution model, which depends on or is influenced by the state of the human worker, was found to have many benefits. A first realization discovered from experimentation is that recognizing changes and anomalies in task execution and the state of the human worker can provide a much earlier anomaly detection in the human-robot manufacturing process as compared to conventional methods. That is, task execution and human health of the worker can provide the early warning of an impending manufacturing process anomaly. A second realization included the recognition that understanding of the typical performance and state of the human worker means that this information can be used in the collaboration between the robot and the human itself such that the combined human/robot performance can be improved. These improvements stein from an optimization of the interaction of the robot with the human worker. As an example, if an anomaly can be detected in either the performance level of the human worker or a state of health of the work base upon threshold approach, then in an assembly line environment where a robot assists a human in completing a task, early detection of the human worker's anomaly can alert the robot to change a robot action in order to accommodate for the human worker's anomaly. For example, the robot can slow its actions to match those of a tired human worker. Alternate examples of robot actions could include performing additional tasks, calling a supervisor for help, holding parts closer to the human worker (at the cost of additional time), improving the comfort of the immediate area by adding light, heating/cooling, etc., and others. All in this means that the process control system can be designed to optimize the process at the human-robot collaboration level, by adjusting the help that the robot is providing to the human worker subject to the condition of the worker. In addition, the process control system knows a holistic description of the human/robot system, it is also capable of detecting anomalies in a total manufacturing process, which can lead to optimizing the speed of the total manufacturing process as well as and the quality of the manufactured product.

However, making such realizations required initially grasping a better understanding of some of the conventional modern manufacturing collaborative processes, requiring humans to work alongside robots and perform tasks that robots cannot do. For example, speed and quality are integral to the conventional modern manufacturing processes. However, because the conventional manufacturing process are composed of multiple concurrent processes, each of which is a sequence of discrete steps, monitoring to achieve optimal speed and quality is difficult. This problem is further complicated when human workers perform tasks alongside robot helpers, because the human workers have variable performance that is subject to their mental and physical condition.

An initial problem of characterizing conventional manufacturing processes using discrete event sequences in a mixed human-robot manufacturing process was how to characterize a human worker's variable performance subject to their mental and physical condition. A first experimentation approach included an assumption that the human-robot manufacturing process will be entirely carried out by robots without considering the human worker. This meant that a complete description of the process could be learned from observing only the sequence of operations on an assembly line. However, when human workers were added to the process, the problem of characterizing the process became much more difficult. This is believed because human workers vary in skill, physiological condition and psychological condition. Moreover, human performance can vary from one day to the next unpredictably due to the interaction of these factors.

An initial problem of learning manipulation tasks with robots was a robot task that was performed independently of a human. In this setting, the sequence of actions taken by the robot is fixed and can be tuned to maximize product quality and manufacturing speed. However, this setting is limited because the dexterity of a robot is still far below this of a human, and thus the scope of tasks that can be tackled by the robot are limited. This necessitates cooperative work with humans in many human-robot manufacturing processes. When the robot works along-side a human, the limitations of the human as described add a new level of uncertainty to the problem. Specifically, it is no longer possible to mechanically optimize the actions taken by the robot because at least one variable in its environment will be dynamically different (sometimes from one product to the next). Thus, the joint human-robot team suffers from significant variability of the human, which impacts the product quality, and the speed of the overall assembly process.

A further experiment included setting up a manufacturing process where the processes were arranged to be collaborative, requiring humans to work alongside robots and perform tasks that robots cannot do. Some aspects discovered was that this introduced a two-fold problem of optimizing speed along the total manufacturing process, and optimizing the interaction between the human and robot to optimize speed and quality of the product. Some aspects learned from experimenting with mixed Human-Robot assembly processes, were that it was insufficient to learn discrete anomaly models for the process, models of human behavior, and models of robot manipulation, independently. The realization here is that a system must be designed to utilize these components to jointly optimize the speed of the process and the quality of the product.

Thus, learning human behavior to learn the precise method of work performed by the human is an important component in designing a process control system. To learn the method of work of the human worker, the worker must be outfitted with sensor that collect information about the ongoing work process (to be described below). In addition, the information collected from the human worker (ex. Arm motion) can be augmented by information in the process control system, by collecting task information such as task label (assembly, inspection, paint, stitch, etc.), expected task duration (typical duration, specified duration, etc.) and human worker skill level (can be expressed in years of employment). Together these features can be recorded in a training database and used to learn a model of the human performance.

Some embodiments of the present disclosure can learn human performance via machine learning methods that capture a description of the human worker performance in a statistical model. Here two types of models may be utilized: predictive models and classification models. Predictive models can be used to learn expected completion time, effectively capturing the patterns observed in sensor data that indicate how a human worker is performing a task. Classification models can be used to learn human worker state (ex. Energetic, tired, slow, etc.) or task performed (assembly, inspection, paint, stitch, etc.).

Some embodiments of the present disclosure summarize the knowledge gained from the predictive models and classification models by creating anomaly detection tables and predicted task completion times. For example, when multiple concurrent processes are taking place, these tables capture the timing information that describes the range of possible sequences in the human-robot manufacturing process. This information is the characterizing information that describes the human-robot manufacturing process. For a fixed execution time, these tables allow us to generate sequences of normal events in a human-robot manufacturing process. Importantly the sequence of events is deterministic with each event following a single prior event. However, if one or more events are variable, then multiple events may follow any single event. Such that using these anomaly detection tables and the predicted task completion time can now make it then possible to anticipate an anomaly that will occur in the process. This occurs when a sequence of events in the future does not match a valid sequence in the anomaly detection table.

A detection of an immediate problem with the human worker can be completed using the classification algorithms. Wherein the classification algorithm can determine a current task that is performed by the human worker and the next worker task. The predicted task and action can be compared to an expected task and action from the control system pre-trained and stored in a memory, and a decision can be rendered on the state of the human worker. Here either an anomaly alarm can be given or an action of the robot helper can be altered to improve the human worker performance. The robot can then learn to alter its behavior by being provided examples of correct behavior given a level of human performance. As will be discussed later, these examples can be explicitly provided or discovered during a learning procedure.

Another aspect of developing the systems and methods of the present disclosure included combining the robot learning with human performance monitoring. Experimentation included better understanding the interaction between the robot and the human during the human-robot manufacturing process. At least one realization was too learning this interaction using statistical models (machine learning) which were capable of making inferences and reacting to the ongoing interaction between the robot and the human operator. To learn these models data was collected from built-in sensors on the robots and from external sensors like cameras. The external sensors can be the same sensors previously used to learn the characterization of the human collaborator, by non-limiting example. The learned model can then use to determine a control method of the robot, which is capable of interacting with the Human collaborator during his/her unique physical states (Energized, tired, slow, etc.). Importantly, this collaboration is learned with the goal of completing the human-robot manufacturing task and maximizing product quality.

According to an embodiment of the present disclosure, a process control system for detecting an anomaly in an execution of a task in a sequence of tasks in mixed human-robot processes. The process control system including a memory configured to store data including robot data, manufacturing process (MP) data, human data, and executable models. An input interface configured to receive human worker (HW) signals and robot operational signals obtained from sensors. A hardware processor configured to extract from the HW signals, a task completion time, measurements relating to a state of the HW and a next predicted sequenced task, and input into a Human performance (HP) model. The HP model determines the state of the HW based on previously learned boundaries of the state of the HW, such that the state of the HW is inputted into a Human-Robot Interaction (HRI) model, to determine a classification of anomaly or no anomaly. Update the HRI model with the robot operation signals, the HW signals and the classified anomaly. Determine a control action of a robot interacting with the HW or a type of an anomaly alarm using the updated HRI model and the classified anomaly. An output interface to output the control action of the robot to change a robot action, or output the type of the anomaly alarm to a management system of the mixed human-robot processes, based on the updated HRI model and the classified anomaly.

According to an embodiment of the present disclosure, a process control method for detecting an anomaly in an execution of a task in a sequence of tasks in mixed human-robot processes. The process control method can include acquiring human-worker (HW) signals and robot operational signals from sensors. Extracting from the HW signals, a task completion time, measurements relating to a state of the HW and a next sequenced task, and input into a Human Performance (HP) model, to obtain a state of the HW based on previously learned boundaries of the state of the HW, the state of the HW is then inputted into a Human-Robot Interaction (HRI) model, to determine a classification of an anomaly or no anomaly. Updating the HRI model with the robot operation signals, the HW signals and the classified anomaly, then determine a control action of a robot interacting with the HW or a type of an anomaly alarm using the updated HRI model and the classified anomaly. Outputting the control action of the robot to change a robot action or output the type of the anomaly alarm to a management system of the mixed human-robot processes, based on the updated HRI model and the classified anomaly. Wherein the steps are implemented by a hardware processor connected to a memory.

According to an embodiment of the present disclosure, a non-transitory computer readable storage medium embodied thereon a program executable by a computer for performing a process control method. The process control method for detecting an anomaly in an execution of a task in a sequence of tasks in mixed human-robot processes. The process control method can include steps of acquiring human worker (HW) signals and robot operational signals from sensors. Extracting from the HW signals, a task completion time, measurements relating to a state of the HW and a next sequenced task, and input into a Human Performance (HP) model, to obtain a state of the HW performance based on previously learned boundaries of the state of the HW, the state of the HW performance is then inputted into a Human-Robot Interaction (HRI) model, to determine a classification of anomaly or no anomaly. Updating the HRI model with the robot operation signals, the HW signals and the classified anomaly, then determine a control action of a robot interacting with the HW or a type of an anomaly alarm using the updated HRI model and the classified anomaly. Outputting the control action of the robot to change a robot action or output the type of the anomaly alarm to a management system of the mixed human-robot processes, based on the updated HRI model and the classified anomaly. Wherein the steps of the process control method are implemented using a hardware processor connected to a memory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A is a schematic diagram illustrating data collection from the sensors associated with the human worker to obtain training data to be stored in a training database, and after the collection of the training data, obtain current human worker data, according to some embodiments of the present disclosure;

FIG. 2B is a schematic diagram illustrating some data collection from sensors that monitor human worker performance tasks, according to some embodiments of the present disclosure;

FIG. 5A is a schematic diagram illustrating interaction between the robot and the human during the human-robot manufacturing process, according to some embodiments of the present disclosure;

FIG. 5B is a block diagram illustrating combining the human model and the robot model into a joint interaction human-robot model, according to some embodiments of the present disclosure;

FIG. 5C is a block diagram illustrating combining the human model and the robot model into a joint interaction human-robot model, which includes training the human model using data collected from the human worker, according to some embodiments of the present disclosure;

FIG. 5D is a block diagram illustrating learning an individual model for both the human and robot, then learns a joint interaction human-robot model that is used to improve the robot policy and finally, this robot policy can be used during the operations;

FIG. 7 is a schematic illustrating a wrist device, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed embodiments.

DETAILED DESCRIPTION

The present disclosure relates generally to systems and methods of model learning technologies, and more specifically to systems and designs of model learning technologies for joint human-robot manufacturing process.

Figure 1A:
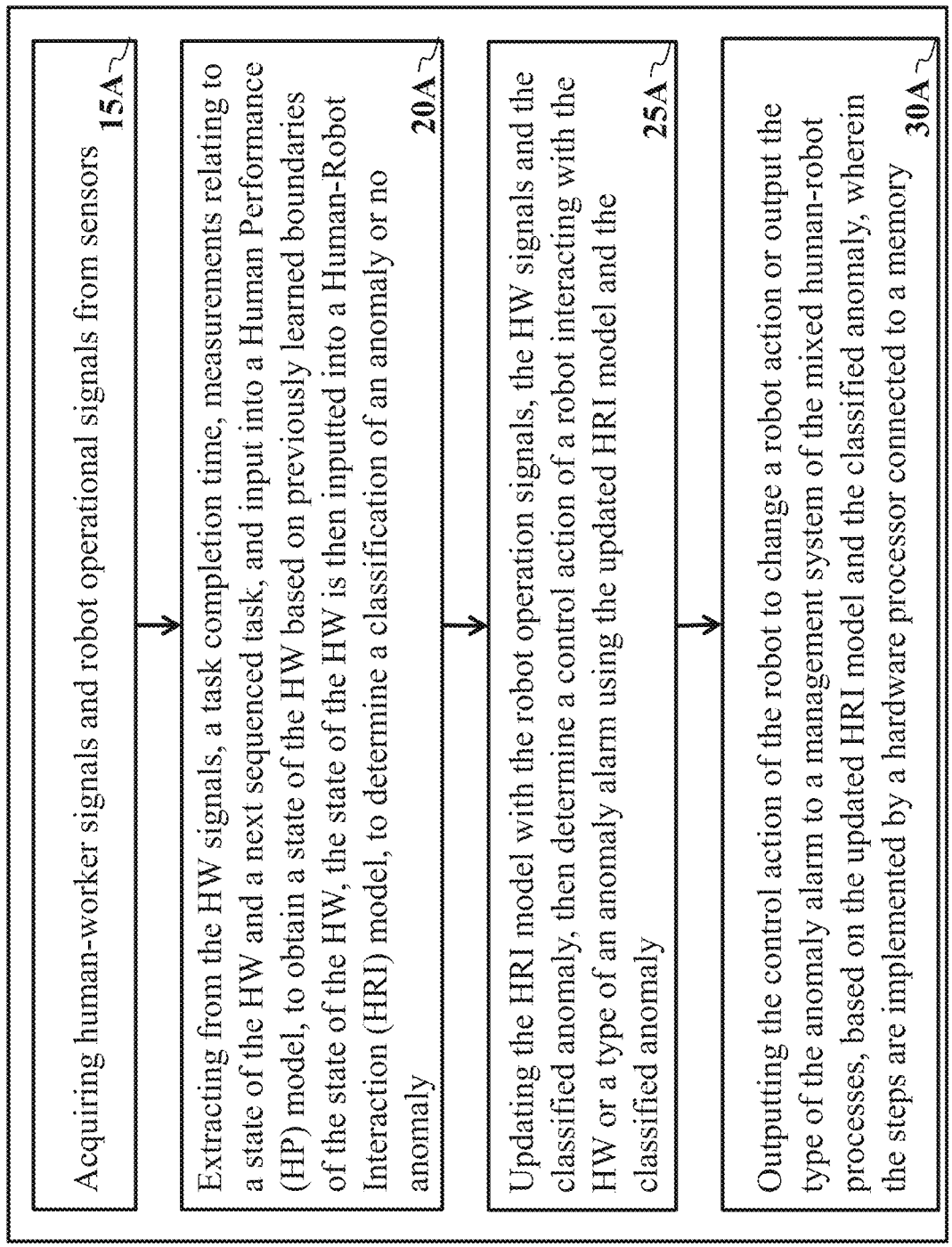
FIG. 1A is a block diagram illustrating a method, according to an embodiment of the present disclosure.

FIG. 1A is a block diagram of a method, according to an embodiment of the present disclosure, that includes a process control method for detecting an anomaly in an execution of a task in a sequence of tasks in mixed human-robot processes. Some of the steps include:

Step 15A of FIG. 1A, acquiring human worker (HW) signals and robot operational signals from sensors.

Step 20A of FIG. 1A includes extracting from the HW signals, a task completion time, measurements relating to a state of the HW and a next sequenced task, and input into a Human Performance (HP) model, to obtain a state of the HW based on previously learned boundaries of the state of the HW, the state of the HW is then inputted into a Human-Robot Interaction (HRI) model, to determine a classification of an anomaly or no anomaly.

Contemplated is that the HP model for the HW can be previously configured to have learned different states of HW performance that correspond as a set of boundaries in the human data. Wherein the HRI model is previously configured to have learned mappings between the different states of the HW and optimal robot actions. Further, the HP model can be constructed from HW training signals of completed training tasks during a training phase prior to receiving the HW signals. Such that, the training signals includes data for each completed training task of the completed training tasks that includes a training task name, multiple training states of the HW for each completed training task, and a next sequenced training task. Wherein the HW training signals can be acquired from sensors associated with the HW during a training operation before acquiring the HW signals, and the HW signals are acquired from sensors associated with the HW during an operation of the mixed human-robot processes.

Still referring to step 20A of FIG. 1A, the HP model can be constructed by a Human Task Execution (HTE) model and a model of the state of the HW. Wherein the HTE model is constructed using at least one predictive model trained using HW training signals obtained during a training phase while completing a sequence of training tasks. Such that the model of the state of the HW is constructed using at least one classification model trained using the HW training signals, and each completed training task is associated with multiple states of the HW, stored in the memory. Also, the HTE model can include the at least one predictive model can be configured to learn expected completion times for each completed task, identify or capture patterns of movements of the HW observed in sensor data obtained from sensors. Wherein at least one statistical model learning approach, includes one or more predictive model, one or more classification model, or both, and is capable of producing estimates of a completion time of an on-going task given sensor measurements of the HW while the HW is interactively working with the robot in completing at least one task.

Further, the at least one classification model is configured to learn a state of the HW from the HW signals by first determining a completed task and a next sequenced task, then uses a gaze detection algorithm to determine the state of the HW, such as an amount of a level of focus and an amount of a level of energy of the HW at a time of completing the task.

Still referring to step 20A of FIG. 1A, contemplated is that the HW training signals of the HTE model includes training data associated with tasks such as identifying a training task for each training task completed, such that for each completed training task includes: (1) a scale of expected task completion durations corresponding with states of the HW ranging from a highest HW performance expected task completion duration at a bottom of the scale to a lowest HW performance expected task completion duration at a highest of the scale; (2) associating the scale of the expected task completion durations to types of durations thresholds, and (3) HW data for each completed training task includes data of the HW at the time of the completed training task such as an age, a level of technical education, a level of higher education, a level of skill in completing the task, a number of years of employment, a height, a weight, a level of mental capacity, a level of physical capacity including physical disabilities. Still another aspect may be that the HW training signals includes training data obtained from sensors such as inertial measurement sensors, biological sensors, on-human body motion sensors, external monitors in an environment the HW is completing the tasks, time information associated with completing each training task of the training tasks, and external motion sensors such as gaze detectors.

Step 25A of FIG. 1A includes updating the HRI model with the robot operation signals, the HW signals and the classified anomaly, then determine a control action of a robot interacting with the HW or a type of an anomaly alarm using the updated HRI model and the classified anomaly.

Step 30A of FIG. 1A includes outputting the control action of the robot to change a robot action or output the type of the anomaly alarm to a management system of the mixed human-robot processes, based on the updated HRI model and the classified anomaly, wherein the steps are implemented by a hardware processor connected to a memory.

Contemplated is that the control action can include adjusting an amount of a robot speed according to the state of the human-worker, or adjusting a direction of the robot including one or a combination of an X-axis direction, Y-axis direction and Z-axis direction. Also, initiating an audible voice command such as indicating a change of robot operation according to the control action. Contemplated is that other control actions may include maintenance related actions for the robot, safety related actions to both the human and the robot, as well as diagnostic related actions for the robot.

Wherein the types of anomaly alarms can a type of a scaling of multiple anomaly alarms based on levels of importance, priority, safety, maintenance, etc., where the levels are predetermined by a user, operator or management related to the manufacturing process, i.e. the specifics can be predetermined based on a specific application designated by the user. For example, the levels can be from a minimal level such as zero requiring no action, up to a maximum level requiring immediate action. Some examples of the types of anomaly alarms having scales from minimum to maximum levels can include, by non-limiting example; (a) a safety anomaly alarm associated with the human-worker, i.e. health of the worker, an operational or environmental issue; (b) a safety anomaly alarm associated with the robot, i.e. maintenance, malfunctions, electronic or software issues, operation concerns, etc. Other types of anomaly alarms having scales from minimum to maximum levels can include, a suspect assembly line mechanical failure, a suspect material supply problem to the assembly line, an under production problem due to the human-worker, a suspect robot related problem, an operator related task or a suspect electronic failure. Also contemplated are group related anomaly alarms prearranged for maintenance departments, operators, management type groups, etc.

According to some embodiments of the present disclosure, some advantages of the systems and methods of the present disclosure overcome the conventional human-robot collaboration process problems by optimizing speed along the total manufacturing process, and optimizing the interaction between the human and robot to optimize speed and quality of the product. This can be accomplished by optimizing the process at the human-robot collaboration level by adjusting the help that the robot is providing to the human worker subject to the condition of the worker, along with being capable of detecting anomalies in the total manufacturing process.

Figure 1B:
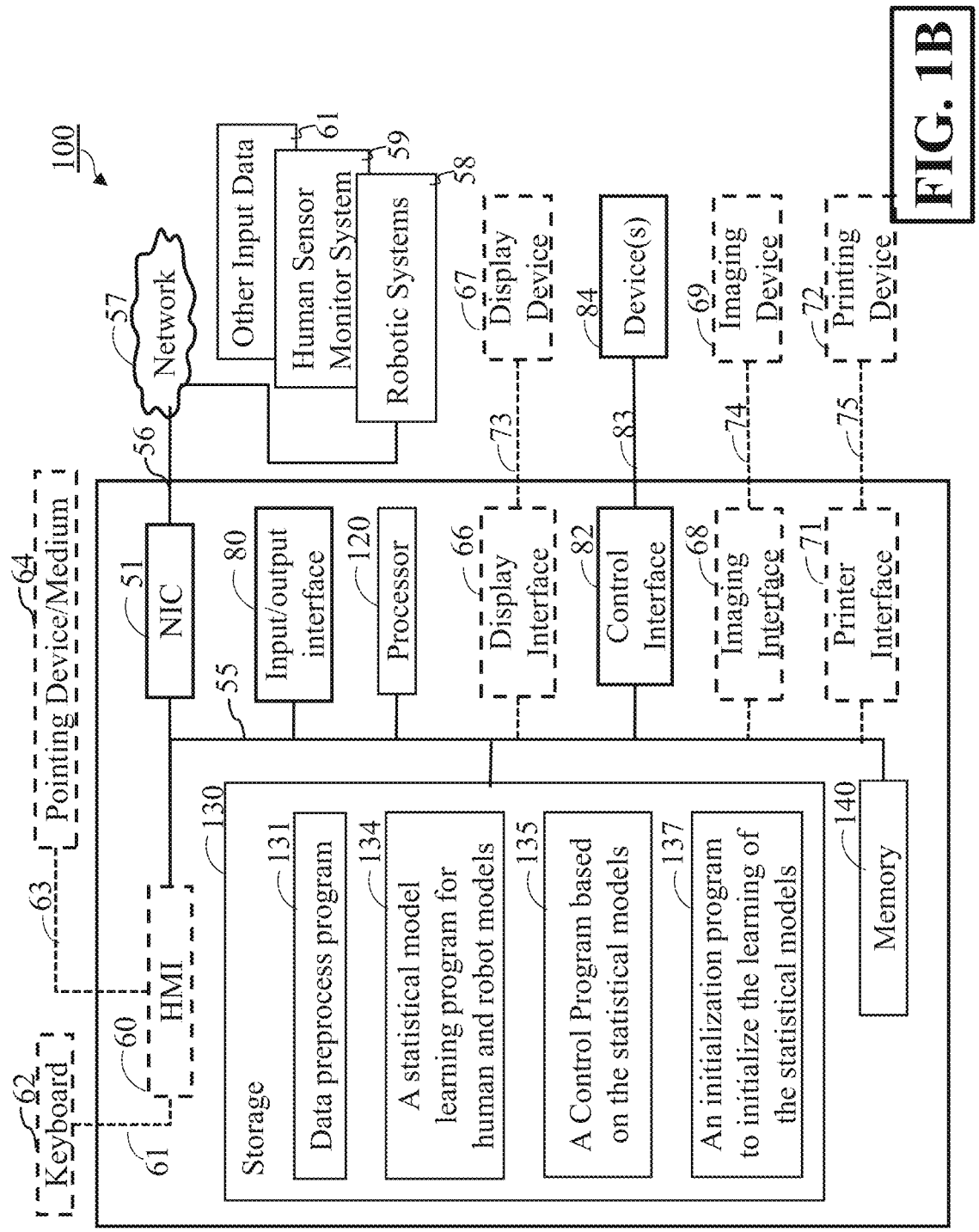
FIG. 1B is a schematic illustrating some components used for implementing the method of FIG. 1A, according to some embodiments of the present disclosure.

FIG. 1B is a schematic illustrating some components used for implementing the method of FIG. 1A, according to some embodiments of the present disclosure. For example, FIG. 1B can be used for implementing embodiments of the robot-human models combined together.

FIG. 1B includes a process control system 100 can be used for controlling a robotic system 58 via bus 55, that may include a network interface controller (NIC) 51 adapted to connect through a bus 56 to a network 57, wherein data can be communicated to and/or from the robotic system 58, i.e. robotic systems, and human sensor monitor system data 59 including input measurements such as those used to monitor the human worker and other possible data and other input data 61. A memory 140 can be used to store computer-executable programs in a storage 130 including a data preprocess program 131, a statistical model learning program for human and robot models 134, a Control Program based on the statistical models 135, an initialization program to initialize the learning of the statistical models 137, and a processor 120 (or more than one processor), in connection with the memory 140. Also stored in the storage 130 is object state history data (not shown) and robot state history data (not shown). There can be components including an input/output interface 80, control interface 82 connected to devices 84 via bus 83.

Some optional components of the process control system can include a human machine interface (HMI) 60 connected via bus 61 to a keyboard 62 and bus 63 to pointing device/medium 64. Other optional components can include a display interface 66 connected via bus 73 to display device 67, imaging interface 68 connected via bus 74 to imaging device 69, printer interface 71 connected via bus 75 to printing device 72.

Figure 1C:
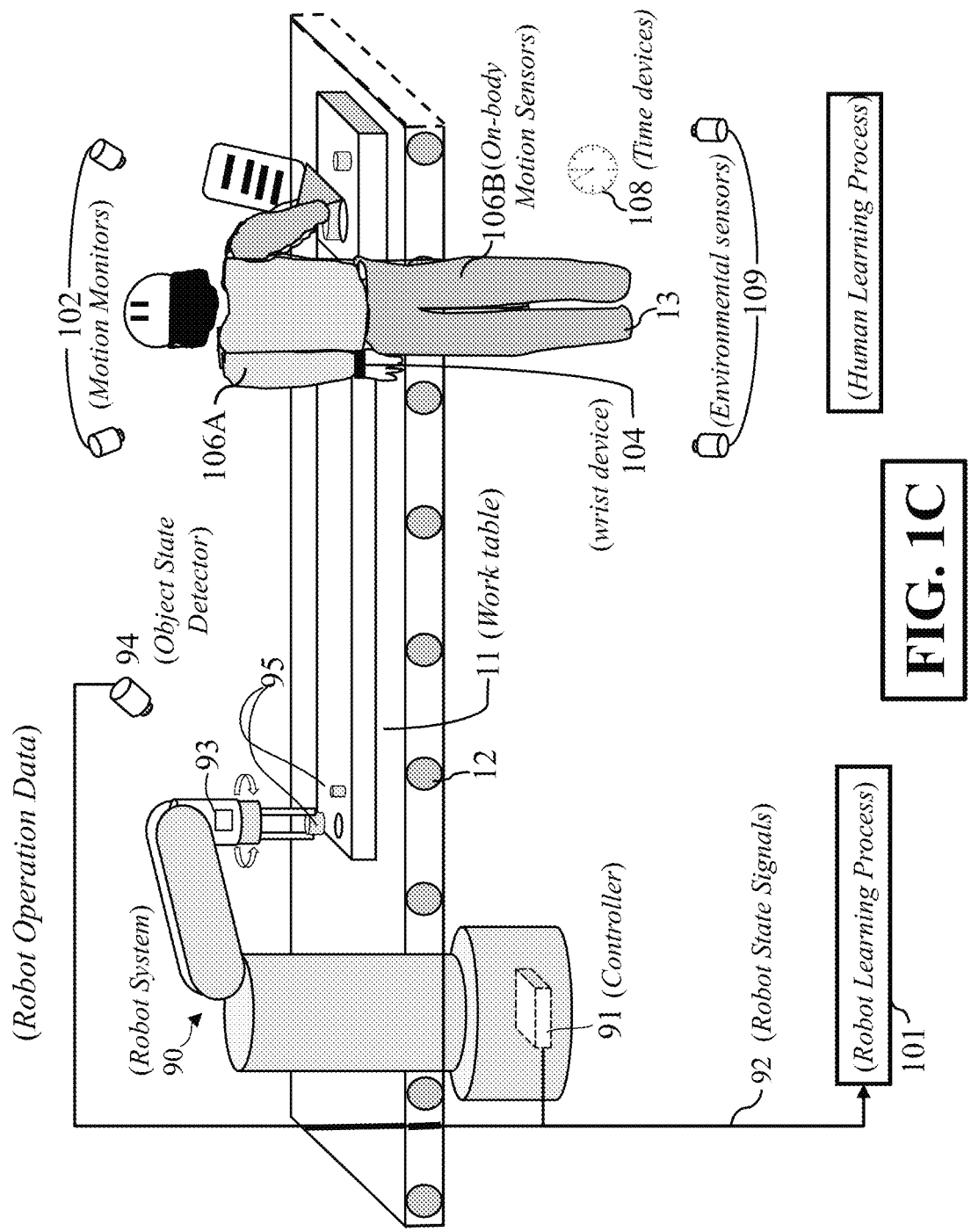
FIG. 1C is a schematic diagram illustrating a robot system and a human worker in an assembly line of a human-robot manufacturing process completing at least one task together, according to some embodiments of the present disclosure.

FIG. 1C is a schematic diagram illustrating a robot system and a human worker in an assembly line of a human-robot manufacturing process completing at least one task together, according to embodiments of the present disclosure. In later figures, a model of human performance, a robot learning process and other processes will be explained in detail. Contemplated is that the assembly line includes multiple stations and at each station includes at least one task to be completed by at least one robot that assists at least one human worker to complete the at least one task.

The robot system 90 includes a controller 91, a robot state detector for example a positional encoder 93, wherein the positional encoder 93 can produce robot state signals 92. The robot system 90 can also include an object state detector for example a camera 94, wherein the camera 94 can produce object state signals of an object 95 to be manipulated by the robot system 90 in a workspace or conveyor 12 of a worktable 11. Wherein the robot system 90 assists at least one human worker 13 in completing at least one task on the worktable 11, such that the workspace or conveyor is capable of moving in a forward direction and a reverse direction in order to assist either the robot and human worker in completing the task. Note that these components 11-12 and 90-94 are here represented as an example but they might vary for different applications since the embodiment of the present disclosure is robust to different applications. In addition, the robot operational data can optionally, depending upon a user specific interest, be sent or received wirelessly to a robot learning process 101.

Still referring to FIG. 1C, a human worker 13 can have sensors for gathering data including a wrist device 104, motion monitors 102, on-body motion sensors 106A, 106B, time devices 108 and environmental sensors 109. The data from these devices facilitates the learning process for the models specific to the human worker. These sensors all together are an example of the human state detector. The human states are considered together with the state of the object to be manipulated 95 and with the state of the robot system 90 to learn the control policy of the robot.

FIG. 2A is a schematic diagram illustrating data collection from the sensors associated with the human worker to obtain training data to be stored in a training database 203, and after the collection of the training data, obtain current human worker data 201, according to embodiments of the present disclosure. For example, the human worker 213 can have a sensor such as a wrist device 204 or some other human body sensor, i.e. attached to or embedded into, the worker 213, and can collect data such as body temperature, blood pressure, heart rate/pulse, breather rate, $O_2$ saturation, skin conductance and skin temperature.

Other sensors such as motion monitors 202, on-body motion sensors 206A, 206B, can collect biometric data such as behavioral identifiers such as physical movements, engagement patterns, physical movements, and physical identifiers such as photos and videos, physiological recognition, voice and boy attributes. Also other sensors can collect time stamp data via time devices 208 and environmental data from environmental sensors 207, such data can include air temperature, air velocity, humidity, air quality and radiant temperature.

FIG. 2B is a schematic diagram illustrating some data collection from sensors that monitor worker performance tasks 211, according to embodiments of the present disclosure. Wherein the data collected can be used for learning a normal or typical operation method of a human worker along with a typical state of the worker. Some of the data collected is from sensors that monitor worker performance tasks that can include external sensors can be used to monitor motion 217, such as using gaze detectors, biometric data 215, environmental sensors 207, time stamps 208 and on-body motion sensors 206A, 206B. Also, included for worker performance task data 220 includes historical task process information, such as task information 222 that is previously stored in a memory 140 of FIG. 1B. The data collected for the process control system can be task labelling (assembly, inspection, paint, stitch, etc.), expected task durations (typical duration, specified duration, etc.) and worker skill levels (can be expressed in years of employment), by non-limiting example.

The environmental data sensing may include an I/O module, which may include wireless communication components or an on-device user interface, a data processor or control module, a power supply that may be a removable or rechargeable battery, or a wireless power converter. The environmental data sensing may include one or more sensors that measure various characteristics of the environment, such as air temperature, air velocity, humidity, air quality 328 and/or radiant temperature. Additionally, sensors such as, but not limited to, turbulence and $CO_2$ sensors are included in the environmental data sensing. The one or more sensors are located at the vicinity of the worker. Although indicated as separate items, it is contemplated that a single sensor of the environmental data sensing may measure more than one variable. For example, an omnidirectional anemometer may be used to measure air velocity as well as turbulence intensity. In another example, the radiant temperature may be determined based on data from an IR camera or by using a separate sensor, such as a glob thermometer. In some embodiments, the environmental data may include a model of the environment and distributions of variables of the model of the environment. The model of the environment includes location of windows and location of doors and walls and the variables of the model of the environment indicate whether the windows and the doors are open or closed. Further, the model of the environment includes a location and a type of a heat source (computer, oven, workers, etc.) in the environment and the variables of the model of the environment indicate a state of the heat source.

Some aspects of the human-worker training signals of the HTE model can include training data associated with task labelling such as identifying a training task name or label for each training task completed, and for each completed training task name or label can include some information including: (1) a scale of expected task completion durations corresponding with states of the human-worker ranging from a highest human-worker performance expected task completion duration at a bottom of the scale to a lowest human-worker performance expected task completion duration at a highest of the scale; (2) associating the scale of the expected task completion durations to types of durations thresholds, and (3) human-worker data to each completed training task label, the human-worker data includes data of the human-worker at the time of the completed training task such as an age, a level of technical education, a level of higher education, a level of skill in completing the task, a number of years of employment, a height, a weight, a level of mental capacity, a level of physical capacity including physical disabilities.

Figure 2C:
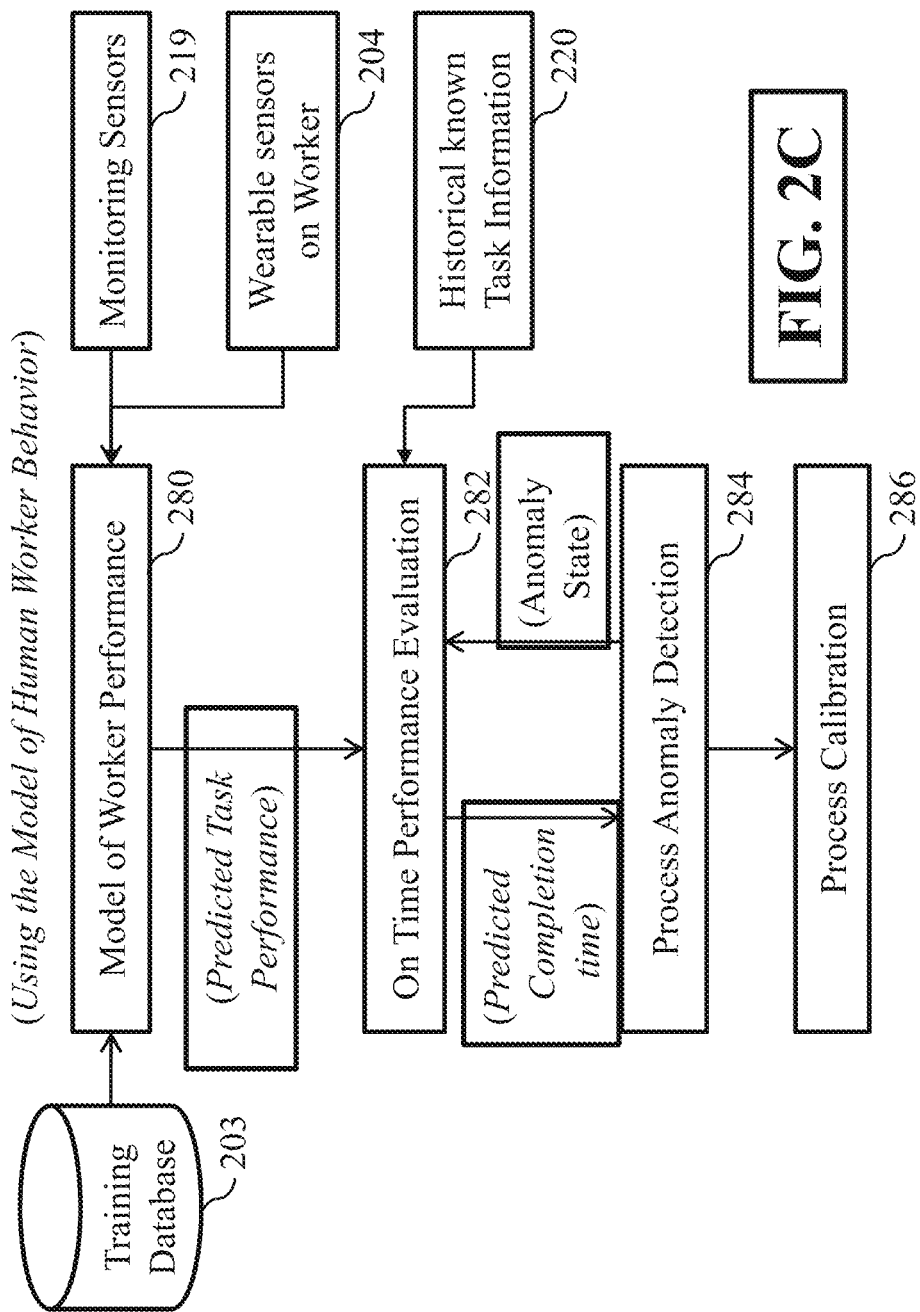
FIG. 2C is a block diagram illustrating some learning process steps of a model of human worker performance, and then doing process calibration for the model of human worker performance, according to some embodiments of the present disclosure.

FIG. 2C is a block diagram illustrating some learning process steps of a model of human worker performance 280, and then exploiting the model of human worker performance, according to an embodiment of the present disclosure. The model of human worker performance 280 is learned via machine learning methods that capture a description of the worker performance in a statistical model. Wherein two types of models can be used, (1) predictive models and (2) classification models.

Step 1 of FIG. 2C can be a learning process step for learning the model of human worker performance 280 by accessing the training database 203 that was collected using the approach shown in FIG. 2B. Wherein the training database 203 can be used to learn both a predictive model and a classification model of the model of human worker performance 280.

The predictive models can be used to effectively learn via training data in the training database 203, operational methods performed by humans to learn expected completion times for different sub-tasks in the series of task, and to effectively capture patterns observed in sensor data that indicate how workers perform tasks in the series of tasks. The predictive models can be trained using historical (past) worker data (i.e. collected prior to collecting current worker data). However, contemplated is that other workers having a similar profile as the worker being assessed, such training data may be collected. Some aspects of a similar profile of other workers can include all of the data obtained about the worker, including years of experience, age, education, physical body characteristics, health condition rating, etc., by non-limiting example. Some collected task information can include task label (assembly, inspection, paint, stitch, etc.), expected task duration (typical duration, specified duration, etc.) and worker skill level (can be expressed in years of employment). Together these features are recorded in the training database 203 and used to assist in learning the model of the human performance. There are many types of predictive algorithms. For simplicity we describe a linear regression predictive model. A linear regression model assumes a linear dependency between the outputs and the inputs: the inputs also called regressors are multiplied by a set of parameters and then summed up to estimate the output. As an example, suppose we have collected one multidimensional regressor point $X=[x1, x2, x3, \ldots, xN]$ where each xi with $\{i=1, \ldots, N\}$ represents one of the described variables such as worker heart rate, worker motion in the x,y, or z direction, room temperature etc. Then suppose that we have estimated a set of parameters, $A=[a1, a2, \ldots, aN]$, through machine learning or system identification techniques to predict the completion time of the current task, tc. Then in this case, the completion time can be predicted as f(X) which is determined as $\hat{tc}=\hat{f}(X)=a1 \times 1 + a2 \times 2 + \ldots + aN \times N$.

Still referring to Step 1 of FIG. 2C, the trained predictive models stored in the training database 203 can include levels of expected completion times for different tasks in the series of task, and patterns of how workers perform tasks in the series of tasks, in order to create thresholds relating to levels of performance that may be used to assist in anomaly detection The classification models can be used to learn the style of work performed by the human. Wherein the classification model, i.e. algorithm, can determine a current task that is performed by the worker and a next worker task, from training data stored in the training database 203. Examples of such algorithms include worker gaze detection algorithms that can determine if the user is focused on his/her on-going task. An example gaze detection algorithm learns a distribution of the worker gaze location (x, y coordinates) during the completion of a task. This distribution is assumed to be unique for each particular task. Then for a known task, the gaze of the worker can be input into this distribution and assigned a probability of belonging to the particular task. If the probability is low, the worker is may be fatigued, distracted, or simply taking a break.

Still referring to Step 1 of FIG. 2C, other methods of tracking worker performance can be built using measurements from inertial measurement sensors, biological sensors, external monitors in the environment, time information, and external motion sensors such as gaze detectors, that may be used to obtain such information as the worker state (ex. Energetic, tired, slow, etc.) or task performed (assembly, inspection, paint, stitch, etc.). As an example of a classification model, we use a Gaussian distribution. This distribution is parametrized using mean and variance. Specifically, we want to learn a Gaussian distribution of the worker Gaze. Here because worker Gaze is tracked in a plane, the learned distribution is 2 dimensional with a mean—$\mu$ and a covariance matrix of size 2×2, $\Sigma$. Model learning comprises of estimating the mean and the covariance matrix from stored gaze data. Then at every point x,y we can determine the value of the distribution, $f(x,y,|\mu, \Sigma)$. To classify if a worker is paying attention to the task, each new gaze location, $x_n, y_n$, is input into the distribution $f(x_n, y_n|\mu, \Sigma)$. A high probability point, p, means that the worker is working on the assigned task. A low probability means that the worker is distracted, tired, taking a break, or working on a different task. Used in this fashion the classification model determines if task completion is normal. However, this approach can also be used to distinguish between tasks. Suppose we have learned a distribution for each task. Then the distribution which yields the highest probability determines task belonging—i.e. classification of the ongoing task.

The trained classification models stored in the training database 203 can include levels of health/alertness of the human workers, in order to create thresholds relating levels of health of workers that may be used to assist in anomaly detection. For example, using the example above, different distributions could be learned for alertness levels of the worker. Here a healthy alert worker might have a narrow Gaussian distribution while a tired worker might have a broad Gaussian distribution. For a known task, comparing these different distributions reveals the alertness level of the worker. For a single distribution, it might be possible to track the change in the covariance matrix $\Sigma$ to determine changes in the worker. In general, worker health can be either explicitly tracked using levels of health, or implicitly tracked by studying the changes in predictions/classifications of the known models.

Still referring to Step 1 of FIG. 2C, once the model of human worker performance or performance model 280 is learned, the performance model 280 is continually updated in order to learn good human worker performance. For example, the performance model is updated when peak performance is observed by the worker. Here peak performance is interpreted in context of the desired application, for example in the scene depicted in FIG. 1C the worker and the robot are collaboratively working on an assembly line. Here peak performance might be the desired products per hour, the desired faulty rate per hour, or a combination thereof. When these conditions are met, the data collected in essence describes method, actions, and state of the worker that produces the desired peak performance. Noted, is that the worker is assumed capable of achieving the target performance rate. This approach will let the performance model 280 develop precise models of good performance and thus precise detection of deteriorating performance. At least one aspect of understanding the typical performance and state of the worker can be that the collaboration between a robot and a human itself may be in identifying changes in robot actions or human worker action, that further improve performance, i.e. for robot, human worker, task completion time, improve an overall speed and quality of the assembly line or product produced. Wherein the "typical (normal) performance" is defined as meeting a desired product output or fault rate threshold as per the example above. Which can be example of adjusting robot performance to the human state, thereby linking the model of human performance to the robot task learning, is adjusting robot speed according to the human state. Here the robot has learned a set of rules that map the human state to a speed. For example, suppose the robot has learned that an energetic worker performs the task at speed A, a tired worked performs the task at speed 0.1 A and a sick worker performs the task at speed 0.5 A. Then in real time using the prediction algorithms, the robot can choose which speed to select given the determined worker state.

Step 2 of FIG. 2C describes this learning of the peak performance of the worker. Here data is continuously collected from the monitoring sensors 219, the wearable sensors 204, and the known task information 220. In addition to this data, there is an available database 203 of prior data that was collected from this worker. When the observed worker performance as desired in the particular application reaches the target performance, then the data is saved to the training database. Similar databases can be created for other conditions of the worker such as tired, sick, unhappy, etc. The data from this (these) database(s) 203 is then used to find the classification and predictions models discussed earlier. The collection of this data is very important because it provides the context needed for anomaly detection and process monitoring which will be described in the upcoming steps.

Step 3 of FIG. 2C can be thought of as the exploitation of the statistical models learned in Step 1 above. Here the classification model can be used for immediate anomaly detection 284, which can detect quickly if a worker's performance is deviating from normal. In addition, as discussed the changes in the classification model can be used to observe deterioration in the worker before a real anomaly is detected. The prediction model can be used to determine when the worker will complete his/her current task. In addition to providing an anomaly detection 284 capability, this also facilitates anomaly detection in the entire process. This is because this information can be used to generate a sequence of events that will happen from this point forward using event transition tables. The anomaly detection 284 and process calibration 286 are then part of Step 4 of the process.

Step 4 of FIG. 2C can be thought of as the model exploitation step. Here we leverage the models learned 280 using the stored data 203 and the currently collected data 204, 219, 220. There are many anomaly detection mechanisms that can be constructed using this experimental setup. One example is directly using the completion time prediction model to determine if a worker is performing well or anomalously. A more complex example is using the completion time in an event transition table and generating sequences of possible manufacturing actions given the predicted task completion time. In each case, the models can directly send an alarm about an immediate anomaly. However, a subtle realization is that the anomaly models can also be used for process calibration 286. For example, if the Gaussian method of gaze detection describe above is showing a growing covariance in the gaze plane, it may be possible to change the manufacturing process to improve speed and quality. For example, a robot could be trained to slow its actions to match the worker actions thereby reducing errors. Alternatively, a robot could be trained to bring the parts closer to the worker to improve focus. Overall, the series of manufacturing events might be rerouted such that other workers replace some of the load observed by the current worker. This means that the statistical models monitoring the worker can also be used to improve the human-robot manufacturing process adaptively with respect to the worker condition.

Figure 3A:
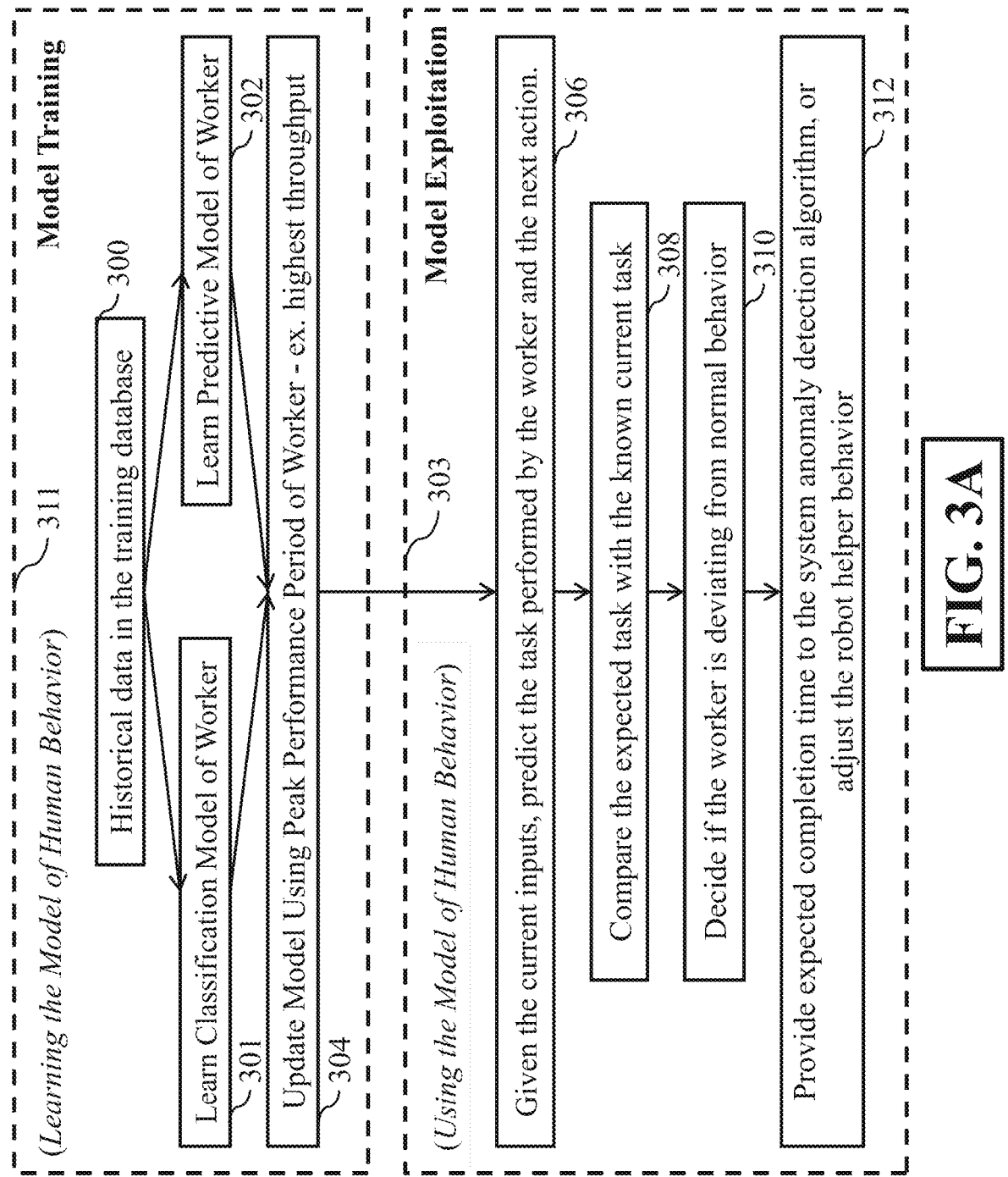
FIG. 3A is a block diagram illustrating some process steps of a model of human worker performance, and then exploiting the model of human worker performance, according to some embodiments of the present disclosure.

FIG. 3A is a block diagram illustrating some process steps of a model of human worker performance 311, and then exploiting the model of human worker performance, according to some embodiments of the present disclosure. This figure specifically describes this learning of the peak performance of the worker. Here there is an available historical database 300 of prior data that was collected from this worker. The stored data, because of its method of collection specifically captures the performance of a worker when they are performing well. Separately, data could also be annotated for other conditions of the worker such as tired, sick, unhappy, etc. The data from this database 300 is then used to find the classification and predictions models. These models are determined in Steps 301 and 302 and can be thought of as the prediction and classification models previously described. The models can then be updated when the corresponding worker condition is detected and new data is collected 304 (as previously described).

Figure 3B:
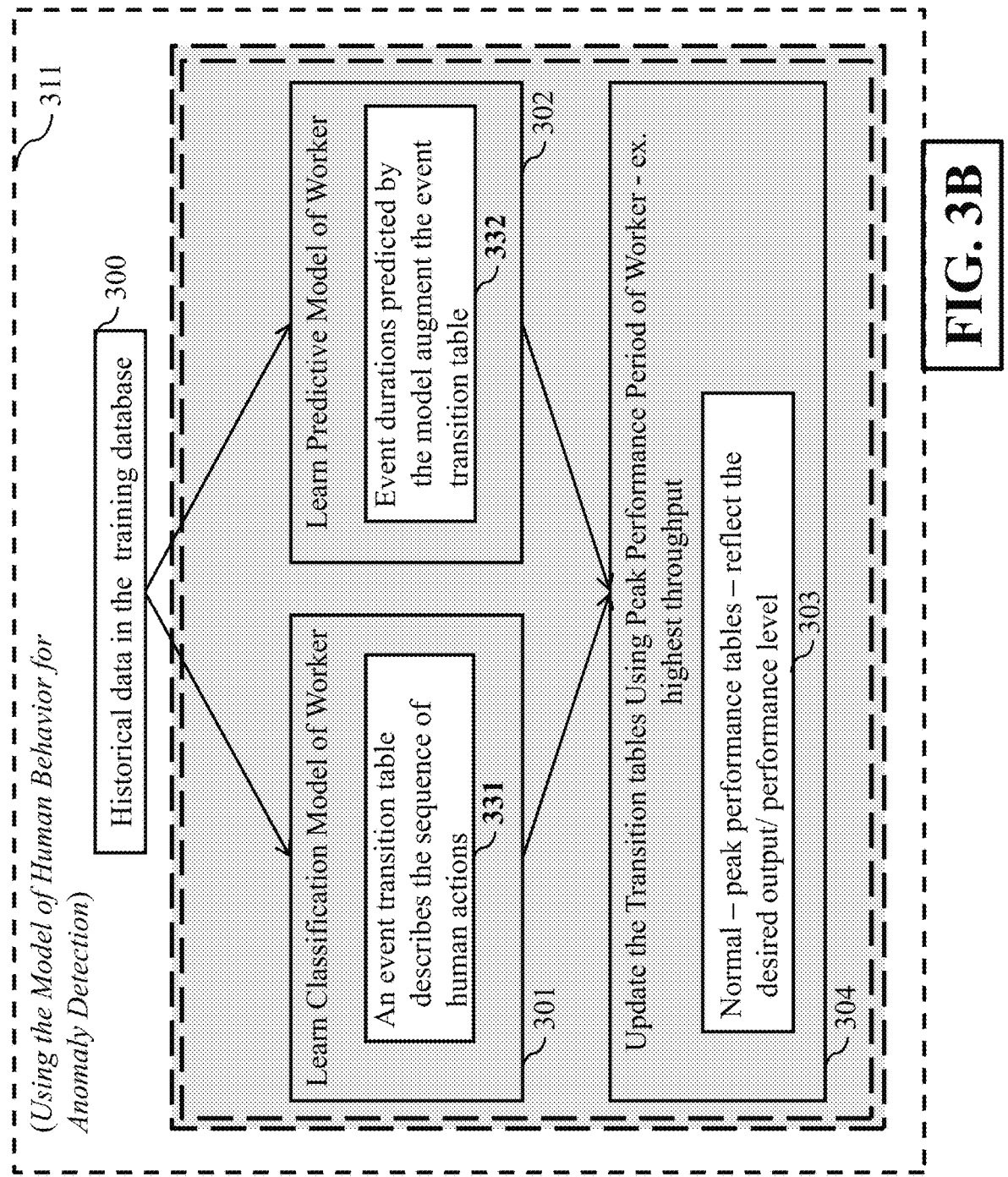
FIG. 3B is a block diagram illustrating some learning process steps of the model of human worker performance of FIG. 3A, and then some process steps for exploiting the model of human worker performance of FIG. 3A, according to some embodiments of the present disclosure.

FIG. 3B is a block diagram illustrating some steps of using the learned model of human worker performance of FIG. 3A in event transition tables. These tables describe the normal sequence of events in the overall human-robot manufacturing process and are a computationally efficient method of anomaly detection. In FIG. 3B, the historical database 300 is used to train classification 301 and prediction 302 models. The classification model can then be used to learn the event transition table 331 because it predicts the event which is currently taking place. In essence the model helps to detect the transition of the worker from one task to the next. The prediction model can be used to augment the event transition tables 332 by learning a distribution of the task completion times. The event transition table can be updated in a similar fashion to models based on application specific conditions. For example, if a worker has achieved the desired product output at a desired fault rate, the typical sequences of manufacture can be created and the event transition table updated. Transition tables can also be created for different worker states.

Figure 4A:
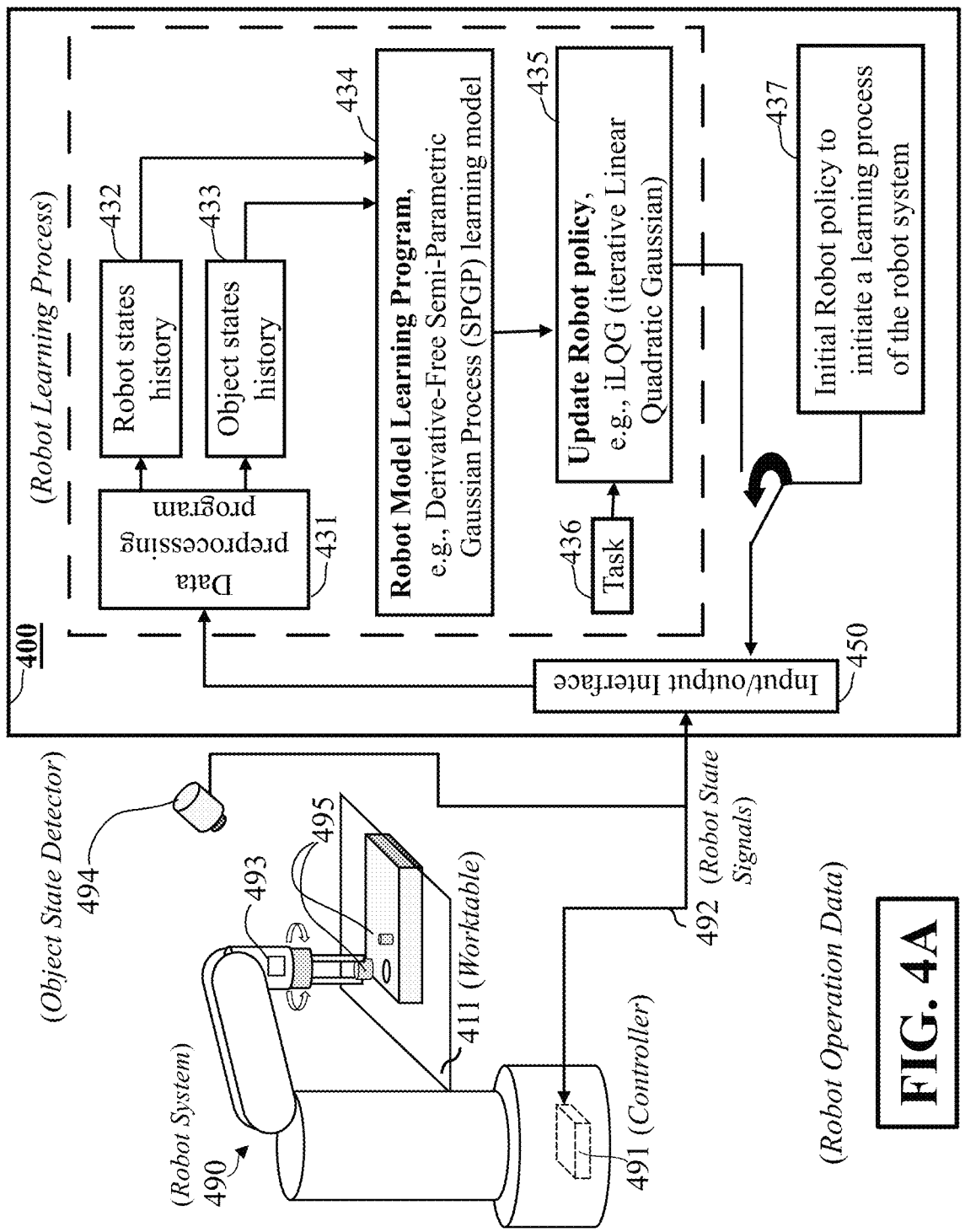
FIG. 4A is a schematic diagram illustrating a robot learning-control apparatus including a Robot Model Learning Program, e.g., Derivative-Free Semi-Parametric Gaussian Process (SPGP) learning model, connected to a robotic system, according to some embodiments of the present disclosure.

FIG. 4A is a schematic diagram illustrating a robot learning-control apparatus including Robot Model Learning Program, e.g., Derivative-Free Semi-Parametric Gaussian Process (SPGP) learning model, connected to a robotic system, according to some embodiments of the present disclosure. The robot learning is also an integral part of the present disclosure which made possible by a learning system for a robot. Contemplated is that other systems can be used such as different types of controllers from different types of a machine learning state of the art approaches using other Model Based Reinforcement Learning techniques, or even from classical control state of the art approaches where the model is learned from data using, for example, Gaussian Processes or Neural Networks, where a control law could be given for example by a Model Predictive Control, by non-limiting example, according to some embodiments of the present disclosure. The components 490, 491, 495 and the worktable 411 define an example of an application to which some of the embodiments of the present disclosure can be applied.

Continuing with the robot learning system of FIG. 4A, a robot learning-control apparatus 400 is used for controlling a robot system, and transmits to the robot controller 491 via interface 450, an initialized and updated robot policy. The robot controller 491 implements the initialized and updated robot policy to execute the task on the object 495. Further, robot state signals 492 of the robot system 490 detected by at least one robot state detector, i.e. a positional encoder 493, object state signals of the object 495 detected by the object state detector, and the initialized robot policy are sent to the Data preprocessing program 431, where the signals are preprocessed and stored in memory as robot states history 432 and object states history 433. Contemplated is that the object state signals can be detected by at least one object detector for example a camera 494. These components 490, 491, 495, 494, 493 are here represented as an example but they may vary depending upon the specific user application or different task related applications, according to some embodiments of the present disclosure.

Still referring to FIG. 4A, in the beginning of the learning (training) process an initial robot policy 437 may move the robot in an exploratory fashion for a predetermined period of time is sent to the robot system 490 using the interface 450. The initial robot policy is an arbitrary signal, which could be for example a sinusoidal signal, a sum of sinusoids or a random signal. During the predetermined period of time, the data collected are the object state and the robot system state detected by 494 and 493, respectively, that the input/output interface 450 sends to the data-preprocessing program 431. In the data-preprocessing program 431, the data are subject to some preprocessing, then then stored in a memory as the robot state history 432 and as the object state history 433, these quantities at each time step contain a finite history of the past positions of the robot and of the object, respectively.

The Robot Model-learning program 434, can be for example the Derivative-free SPGP (DF-SPGP) which takes as an input the robot states history 432, the object states history 433 and the initial robot policy. In performing the DF-SPGP Model learning program 434, the Derivative-free SPGP (DF-SPGP) kernel learning program (not shown) and the Derivative-free SPGP Model learning program are trained. The Derivative-free SPGP model obtained in 434 together with the task specification 436 of the task that the robot has to compute on the objects 495 are used to compute the updated robot policy in 435. In 435, the robot policy can be for example, the Iterative Linear Quadratic Gaussian (iLQG), but it could be replaced with any trajectory optimization technique model-based. Once the updated robot policy is learned in 435 this can be sent to the robot system via the input/output interface 450 and the controller 491. The robot system 490 performs now the task on the object 495. The Derivative-free SPGP (DF-SPGP) Model-learning program in 434 and the policy algorithm Iterative Linear Quadratic Gaussian (iLQG) in 435 are only an example that has been shown to be successful for robot manipulation. Accordingly, to some embodiments of the present disclosure, the model-learning program 434 and the policy computation 435 are not restricted to be the one illustrated here. The model 434 could be for example a standard Gaussian process, a deep neural network or any other function approximators for the forward dynamics. The policy 435 could also be any other model-based controller such as Model Predictive Control. The component 434 and 435 could also be combined together to determine a policy without a specific model, using therefor model-free policy algorithms such as PID controllers or model-free reinforcement learning algorithms.

Figure 4B:
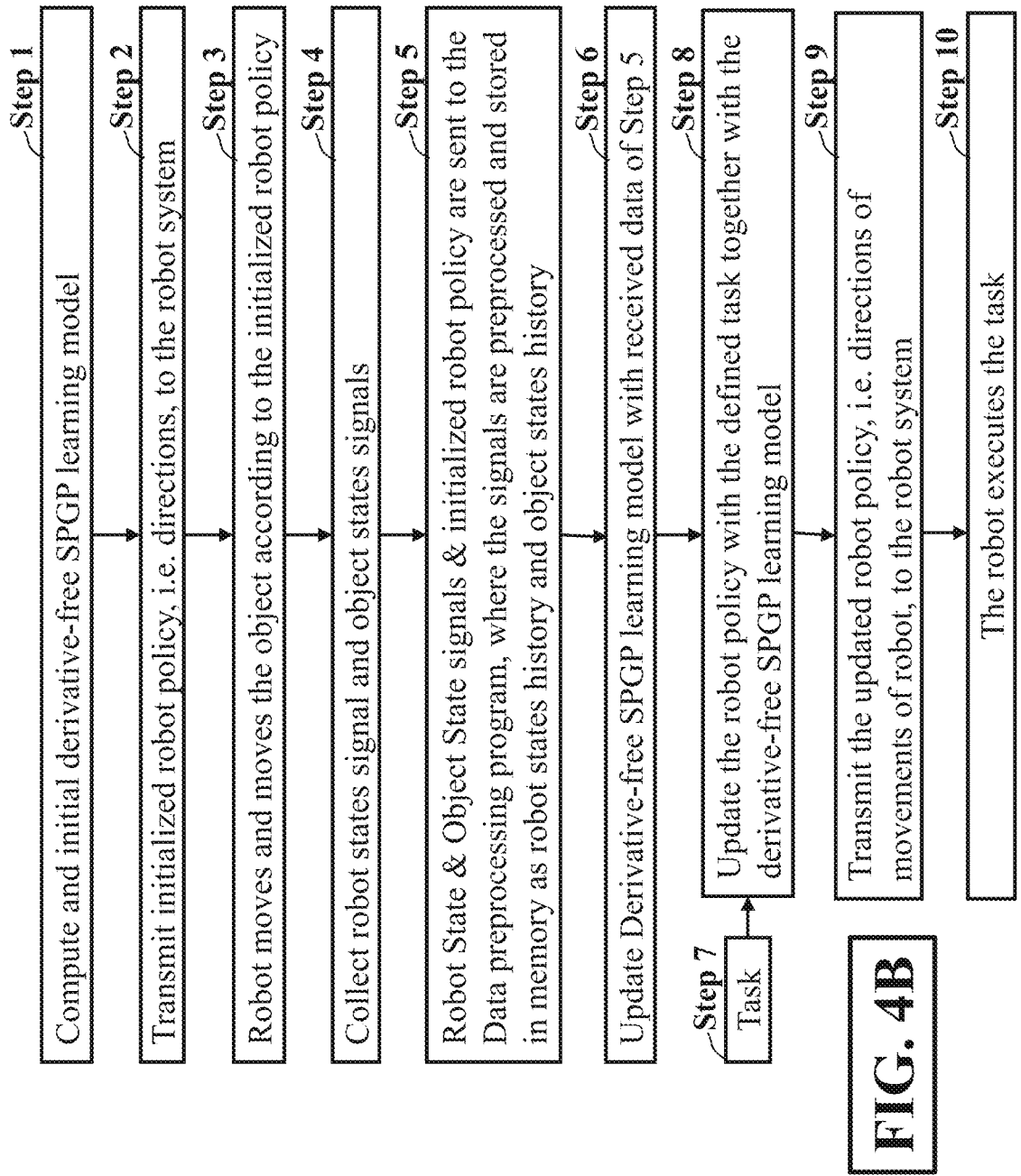
FIG. 4B is a block diagram illustrating a flowchart describing the robot model learning program, i.e. a derivative-free Semi-Parametric Gaussian Process (SPGP) learning model of FIG. 4A, that initiates the robot policy to start the learning process of the robot system for a predetermined period of time, according to some embodiments of the present disclosure.

FIG. 4B is a block diagram illustrating a flowchart describing some steps of the robot model learning program, i.e. a derivative-free Semi-Parametric Gaussian Process (SPGP) learning model of FIG. 4A, that initiates the robot policy to start the learning process of the robot system for a predetermined period of time, according to embodiments of the present disclosure.

Referring to FIG. 4B and FIG. 4A, step 1 of FIG. 4B computes and initializes the robot policy to initiate the learning process of the robot system.

Step 2 of FIG. 4B transmits the initialized robot policy via a control signal to the robot system (490 of FIG. 4A), via the interface 450 of FIG. 4A, which sends the control signal to the controller 491 of FIG. 4A, which makes the robot system 490 of FIG. 4A move accordingly to the initialized robot policy in the next step (step 3).

Step 3 of FIG. 4B receives the control signal which is used by the robot system 490 of FIG. 4A to manipulate the object 495 of FIG. 4A for the predetermined period of time.

Step 4 of FIG. 4B collects the robot states signal 492 of FIG. 4A and the object states signals from the object state-detector 494 of FIG. 4A and sends the signals to the robot learning-control apparatus 400 of FIG. 4A via the interface 450 of FIG. 4A.

Step 5 of FIG. 4B receives and sends the signals along with the initialized robot policy to the Data preprocessing program 431 of FIG. 4A, where the data are preprocessed and stored in memory as robot states history 432 of FIG. 4A and object states history 433 of FIG. 4A.

Step 6 of FIG. 4B updates the Derivative-free SPGP learning model 434 of FIG. 4A with the received data of the previous step (step 5).

Step 7 of FIG. 4B defines a task 436 of FIG. 4A that the robot system should compute on the manipulated object 495 of FIG. 4A.

Step 8 of FIG. 4B uses the defined task together with the derivative-free SPGP learning model to update the robot policy using iLQG 435 of FIG. 4A.

Step 9 of FIG. 4B the updated robot policy is then transmitted to the robot system 490 of FIG. 4A using the interface 450 of FIG. 4A that is connected to the controller of 491 FIG. 4A.

Step 10 of FIG. 4B executes the updated robot policy via robot system 490 of FIG. 4A which performs the task manipulating of the object 494 of FIG. 4A accordingly to the updated policy 435 of FIG. 4A obtained using the Derivative-free SPGP learning model 434 of FIG. 4A.

Referring to FIG. 4A, according to aspects of the present disclosure a model learning system (as for example the derivative-free model learning program described above) can be arranged in a robot learning-control apparatus that can be arranged within the process control system 100 of FIG. 1B, or arranged as a separate unit that can include at least the components of the process control systems of FIG. 1B, according to embodiments of the present disclosure. The robot learning-control apparatus can be used for controlling the robot system 490 and configured to transmit an initial and updated policy program to the robot system 490, via interface 450. Wherein the robot state signals 492 of the robot system 490 and object state signals are received with respect to the object 495 to be manipulated by the robot system 490 on a worktable 411. The object state signals are detected by at least one object detector 494, and the memory 140 of FIG. 1B can store computer-executable programs in the storage 130 of FIG. 1B including a data preprocess program 131, object state history data 133, robot state history data 132, a statistical model learning program 134, an update-policy program 135, an initial policy program 137, a robot states history 132 and an object states history 133, and a processor 120 (or more than one processor), in connection with the memory 140 of FIG. 1B. The processor 120 of FIG. 1B is configured to transmit the initial policy program 137 of FIG. 1B to the robot system 195 of FIG. 1B via a network 57 for initiating a learning process that operates the robot system manipulating the object while a preset period of time. In this case, a processor can update the Model learning program 434 according to the object state history data and the robot state history data converted, using the data preprocess program 431, from sets of the robot state and object state signals having received in the preset period of time, wherein the processor updates the update-policy program 435 according to the updated Model learning program 434.

Combining the Robot Learning with Human Performance Monitoring

FIG. 5A is a schematic diagram illustrating interaction between the robot and the human during the human-robot manufacturing process, according to some embodiments of the present disclosure.

To learn this interaction statistical models are used and are based on machine learning capable of making inferences and reacting to the ongoing interaction between the robot and the human operator. To learn these models, we collect data from built-in sensors on the robots from external sensors like cameras. The external sensors can be the same sensors previously used to learn the characterization of the human collaborator, for example, or other external sensors located in proximity to the robot system.

The learned interaction statistical model is a combined representation of the robot and of the human collaborator. At a conceptual level, this learned model could be as the addition of adding features that represent the human collaborator and the robot during the learning process, or learning individual representations separately, and then later combining these into a global model.

Still referring to FIG. 5A, specifically, as an illustrative example, we take the case of where the robot model is learned jointly on the robot state and action space and on the human state and action space. The robot model is learned during a training phase. The training phase might consist on a first phase that gathers human data, such as a worker or a population of workers that can be observed by external sensors (ex. one or more cameras) and other sensors. With this human data, a predictive model can be learned to infer quantities like predicted completion time or predicted worker movements and a classification model to infer a state of the worker(s) and the task on which the worker is currently working. Then second, we initialize a control law or policy that enables the robot to perform reasonably well in the operations the robot has to accomplish to help the worker. An expert engineer can do this, by kinesthetic teaching or through simulation via machine learning techniques such as reinforcement learning. The final stage of training can consist of training a global model that is defined on the state space including the state space of the robot and of the human. The policy of the robot is now adaptively improved accordingly to this learning model as the worker and the robot work together to accomplish the task. These adaptive online machine learning techniques can be used to update the learning interaction statistical model and the robot policy as data is collected from the built-in sensors of the robot and human worker. In this way, the robot will not only perfect the robot's own policy, but will also be able to adapt to different situations in which the state of the worker changes. The robot should be a co-bot and/or controlled in compliance mode in order to guarantee the safety of the worker.

The resulting learned interaction statistical model or joint interaction human-robot model of robot/human can be very different for different states of the human. This is illustrated in FIG. 5A, and by necessity this figure is two-dimensional, but it can be logically extended to any number of dimensions. Here the robot only has one possible action speed up or slow down. The human has only two possible states tired or energetic. The robot must learn that when the human is energetic and the robot can have a faster speed and when the human is tired the robot can have a slower speed. When the interaction statistical models are learned the robot will learn that there is a higher cost to fast action if the worker is tired, and an optimal cost to lower speed. The same is true in reverse if the worker is energetic. FIG. 5A also demonstrates the need for human performance models. It is certainly true that this same principle could be accomplished by directly feeding human measurements to the robot. However, this would cause the state space of the robot to become much large adding noise and computational complexity to the problem. Thus, it is advantageous to first learn a model of the human state evolution and include this in the combined human/robot model.

FIG. 5B, FIG. 5C and FIG. 5D, illustrate multiple methods of developing the interaction statistical model or joint interaction human-robot model, wherein three possible training approaches can yield the combined joint interaction human-robot model described conceptually above, i.e. FIG. 5B, 501B; FIG. 5C, 508C; and FIG. 5D, 509D.

FIG. 5B illustrates the first approach 501B that focuses on combining the human model 504B and the robot model 507B into a joint interaction human-robot model 505B. This model uses its corresponding data, human data 502B and a training phase 503B and robot data 506B and a training phase 511B that is unique to the given data set. The resulting model 505B relies on the output of both previously learned models 504B and 507B. This approach can be a direct method of combining these models.

A policy for the robot based on the robot model 507B and on the task 517B, the robot has to achieve, e.g., help the human worker in the assembly line task, is computed. The policy can be achieved with any policy optimization algorithm 512B, with model based reinforcement learning or optimal control as described above. When, the joint interaction human-robot model 505B is computed, this can be used to improve the robot policy 512B, that can be updated not only considering the robot model 507B and the task 517B, but also having information of the human model 504B, in order to have new robot policy 512B.

FIG. 5C is a block diagram illustrating combining the human model and the robot model into a joint interaction human-robot model, which includes training the human model using data collected from the human worker, according to some embodiments of the present disclosure. This second approach 508C to combining these models begins by training 503C a human model 504C using data collected from the human worker 502C. The human model 504C is then used with the robot data 506C during training 511C of the joint interaction human-robot model 505C. When, the joint interaction human-robot model 505C is computed, this can be used to learn a new robot policy 512C. At least one advantage of this second approach is that we are learning a unified model whose input features include the model learned about the human worker.

FIG. 5D is a block diagram illustrating learning an individual model for both the human and robot, then learns a joint interaction human-robot model that is used to improve the robot policy and finally, this robot policy can be used during the operations, such that while the robot and the human are operating, data can be collected, so that the robot model and the robot policy are continuously updated using the collected data, according to some embodiments of the present disclosure. The third approach 509D begins similarly to the first approach 501B. Here a human model 504D and a robot model 507D are combined into a joint interaction human-robot model 505D. Each model uses its corresponding data, human data 502D and a training phase 503D and robot data 506D and a training phase 511D that is unique to the given data set. The resulting model 505D relies on the output of both previously learned models 504D and 507D.

This model is used to learn a first robot policy 512D. As a difference with the first approach in 501B, the robot model 507D and the robot policy 512D are updated online. While the human is co-working with the robot, which is controlled under the robot policy 512D, data from both the human and the robot are collected in 519D. The data are the same as described in some embodiments of the present disclosure above. These data are then used online to improve the robot model 507D and the robot policy 512D. The updated robot model and robot policy can be thought of as corrections to the initial robot model 507D and to the initial robot policy 512D that are used with the original robot model 507D to ensure proper robot operation.

In all cases, the learned joint interaction human-robot model is then used to determine a control method of the robot, which is capable of interacting with the collaborator during his/her physical states (Energized, tired, slow, etc.) uniquely, represented by his/her measurements. Importantly, this collaboration is learned with the goal of completing the human-robot manufacturing task and maximizing product quality. Because collecting data in this setting may be time consuming, and because the robot in this system is an engineered device. The models learned here can also incorporate physical knowledge e.g., equations of motion of the robot, characteristics of the human operator and possibly task dependent features as prior information to the machine learning algorithm.

Figure 6:
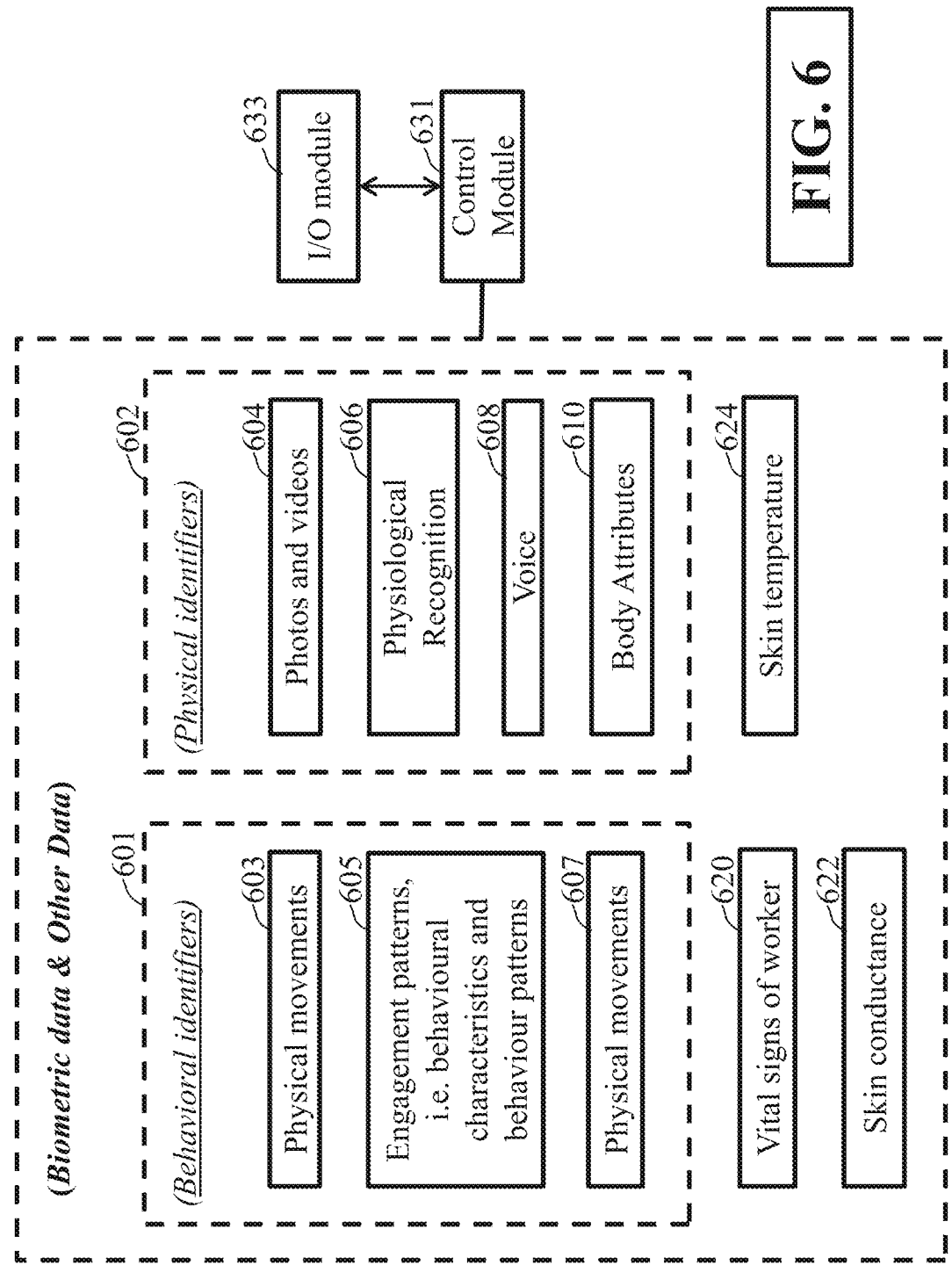
FIG. 6 is a block diagram illustrating some sensing data including biometric and other data that can be collected and be used in assisting the process control system in detecting anomalies, according to some embodiments of the present disclosure.

FIG. 6 is a block diagram illustrating some sensing data including biometric and other data that can be collected and be used in assisting the process control system in detecting anomalies, according to some embodiments of the present disclosure. For example, some biometric data can include behavioral identifiers 601 that may include physical movements 603, engagement patterns 605 such as behavioral characteristics and behavior patterns, physical movements 607. Some other biometric data can include physical identifiers 602 that may include photo & videos 604, physiological recognition 606, voice 608 and body attributes 610. Other data that can be collected can include vital signs of the worker 620, skin conductance 622 and skin temperature.

The biometric data sensing may include an I/O module, which can include wireless communication components or an on-device user interface, control module, a power supply that may be a removable or rechargeable battery. The biometric data sensing may include one or more sensors that measure heart rate, vital signs of the worker 620, skin temperature 624, and/or skin conductance 622. The one or more sensors are located at the vicinity of the worker. A heart rate monitor or a heart rate sensor may measure the heart rate of the worker. The heart rate sensor should have accuracy sufficient to differentiate between the LF band and the HF band. Further, based on the heart rate measurements, a processor module can be used to determine a ratio of low spectral frequency (LF) heart rate variability to high spectral frequency (HF) heart rate variability. A higher ratio of LF to HF corresponds to a higher level of discomfort for the worker. The vital signs of worker 620 may be obtained by utilizing a remote photo plethysmography (RPPG) sensor. In some embodiments, a wearable device may be used for measuring the vital signs of the worker, wherein during an operation of the process control system, the wearable device can be in remote communication with the input interface of the process control system.

Still referring to FIG. 6, the skin conductance 622 may be measured as the galvanic skin response reflecting the change in electrical properties of the worker's skin associated with evaporative transfer from the worker's skin. The skin temperature 624 may be used to quantify the heat transfer between the worker and the environment. Each of the skin conductance and the skin temperature measurements may be compared to respective predefined ranges indicative of a particular worker's preference. The biometric data sensing may include an IR camera that outputs IR image of the worker. Analysis of the IR image may provide an estimate of clothing level by comparing temperature of the outer most layer of clothing to the skin temperature of the worker. To obtain the biometric data one or more sensors may be in direct contact with the skin of the worker. For example, the sensing may be a wearable device, such as a watch, bracelet, necklace, shoe insert, or arm band.

FIG. 7 is a schematic illustrating an example of a wearable wrist device, according to some embodiments of the present disclosure. The wearable device 746 may be disposed on wrist of the worker 748. The wearable device 746 can be configured to display a list 750 as well as obtain data for each item in the list 750. For example, such display and data obtained in the list 750 can include body temperature 751, blood pressure 752, pulse rate 753, breathing rate 754, $O_2$ saturation 756, skin conductance 757 and skin temperature 758.

Model Based Reinforcement Learning Using Gaussian Process Regression

Here we describe the standard model learning framework using Gaussian Process Regression (GPR) and a trajectory optimization algorithm adopted in Model Based Reinforcement Learning MBRL. This is to give a technical explanation of how the statistical model learning 134 of FIG. 1B, the Control Program 135 of FIG. 1B, the model learning 434 of FIG. 4A, the Update Policy 435 of FIG. 4A can be computed.

An environment for RL is formally defined by a Markov Decision Process (MDP). Consider a discrete-time system $\tilde{x}_{k+1}=f(\tilde{x}_k, u_k)$ subject to the Markov property, where $\tilde{x}_k \in R^{n_s}$ and $u_k \in R^{n_u}$ are the state vector and the input vector at the time instant k. When considering a mechanical system with generalized coordinates $q_k=[q_k^1, \ldots, q_q^n] \in R^n$, the dynamics equations obtained through Rigid Body Dynamics, suggest that, in order to satisfy the Markov property, the state vector $\tilde{x}$ should consist of positions, velocities, and accelerations of the generalized coordinates, i.e. $\tilde{x}_k=[q_k, \dot{q}_k, \ddot{q}_k] \in R^{3n}$, or possibly of a subset of these variables, depending on the task definition.

Model-based RL algorithms derive the policy $\pi(\tilde{x}_k)$ starting from $\hat{f}(\tilde{x}_k, u_k)$, an estimate of the system evolution.

Gaussian Process Regression

GPR can be used to learn $\hat{f}(\tilde{x}_k, u_k)$. Typically, the variables composing $\tilde{x}_{k+1}$ are assumed to be conditionally independent given $\tilde{x}_{k+1}$ and $u_k$, and each state dimension is modeled by a separate GPR. The components of $\hat{f}(\tilde{x}_k, u_k)$ denoted by $\hat{f}^i(\tilde{x}_k, u_k)$, with i=1 ... $n_s$, are inferred and updated based on $\{X, y^i\}$, a data set of input-output noisy observations. Let N be the number of samples available and define the set of GPR inputs as $X=[\bar{x}_1, \ldots, \bar{x}_N]$ where $\bar{x}_k=[\tilde{x}_k, u_k] \in R^m$ with $m=n_s+n_u$. As regards the outputs $y^i[y_1^i, \ldots, y_N^i]$, two definitions have been proposed in the literature. In particular, $y_k^i$ can be defined as $\tilde{x}_{k+1}^i$, the i-th component of the state at the next time instant, or as $y_k^i = \tilde{x}_{k+1}^i - \tilde{x}_k^i$, leading to $\hat{\tilde{x}}_{k+1} = \tilde{x}_k + \hat{f}(\tilde{x}_k, u_k)$. In both cases, GPR models the observations as $$y^i = \begin{bmatrix} f^i(\bar{x}_1) \\ \vdots \\ f^i(\bar{x}_N) \end{bmatrix} + \begin{bmatrix} e_1 \\ \vdots \\ e_N \end{bmatrix} = f^i(X) + e, \quad (1)$$

where e is Gaussian i.i.d. noise with zero mean and covariance $\sigma_n^2$, and $f^i(X):N(m_{f^i}(X), K_{f^i}(X,X))$. The matrix $K_{f^i}(X,X) \in R^{N \times N}$ is called the kernel matrix, and is defined through the kernel function $k_{f^i}(\cdot, \cdot)$, which is the kernel learning program. Under these assumptions, the posterior distribution of $f^i(\cdot)$ is Gaussian and is available in closed form. In GPR, which is the model learning program, the crucial aspect is the selection of the prior functions for $f^i(\cdot)$, defined by $m_{f^i}(\cdot)$, usually considered 0, and $k_{f^i}(\cdot, \cdot)$. In the following we will refer to $f(\cdot)$ and $k(\cdot, \cdot)$ as one of the $f(\cdot)$ components and the relative kernel function, respectively. In the literature, when GPR is applied to modeling of physical systems, the kernel function or kernel learning program is often defined in one of the following cases.

Physically Inspired Kernels

When the physical model of the system is derived by first principles, the model information might be used to identify a feature space over which the evolution of the system is linear. More precisely, assume that the model can be written in the form $y_k = \varphi(\bar{x}_k)^T w$, where $\varphi(\bar{x}_k): R^m \to R^q$ is a known nonlinear function obtained by first principles that maps the GPR inputs vector $\bar{x}_k$ onto the physically inspired features space, and w is the vector of unknown parameters, modeled as a zero mean Gaussian random variable, i.e. w: $N(0, \Sigma_{PI})$, with $\Sigma_{PI} \in R^{q \times q}$ often chosen to be diagonal. The expression of the physically inspired kernel (PI) is $$k(\bar{x}_k, \bar{x}_j) = \varphi(\bar{x}_k)^T \Sigma_{PI} \varphi(\bar{x}_j), \quad (2)$$

namely a linear kernel in the features $\varphi(\cdot)$. The efficiency of PI kernels in terms of estimation performances is closely related the adherence between the model and the behaviors of the real system. When the model is accurate these kernels exhibits good performances in terms of accuracy and generalization.

For later convenience, we define also the homogeneous polynomial kernel in $\varphi(\cdot)$, which is a more general case of (2), $$k_{poly}^p(\bar{x}_k, \bar{x}_j) = (\phi(\bar{x}_k)^T \Sigma_{PI} \phi(\bar{x}_j))^p. \quad (3)$$

Notice that the linear kernel is obtained when p=1. The hyper-parameters to be estimated remain the diagonal elements of the matrix $\Sigma_{PI}$.

Nonparametric Kernel

When there is no known structure of the process to be modeled, the kernel has to be chosen by the user accordingly to their understanding of the process to be modeled. A common option is the Radial Basis Function kernel (RBF):

$$k_{RBF}(\bar{x}_k, \bar{x}_j) = \lambda e^{\frac{(\bar{x}_k - \bar{x}_j)^T \Sigma_{RBF}^{-1}(\bar{x}_k - \bar{x}_j)}{2}}, \quad (4)$$

where $\lambda$ is a positive constant called the scaling factor, and $\Sigma_{RBF}$ is a positive definite matrix that defines the norm over which the distance between $\bar{x}_k$ and $\bar{x}_j$ is computed. The scaling factor and the elements of $\Sigma_{RBF}$ are unknown parameters called hyper-parameters; for this reason, it is called a nonparametric (NP) kernel. Several options to parametrize $\Sigma_{RBF}$ have been proposed e.g., a diagonal matrix or a full matrix defined by the Cholesky decomposition, namely $\Sigma_{RBF} = LL^T$. In this case, the hyper-parameters of $\Sigma_{RBF}$ are the elements of the lower triangular matrix L, where the elements along the diagonal are constrained to be positive. Notice that with this choice, all the positive definite matrices are parameterized.

Semiparametric Kernel

This approach combines the physically inspired and the non-parametric kernels. Here the kernel function is defined as the sum of the covariance's:

$$k(\bar{x}_k, \bar{x}_j) = \phi(\bar{x}_k)^T \Sigma_{PI} \phi(\bar{x}_j) + k_{NP}(\bar{x}_k, \bar{x}_j). \quad (5)$$

where $k_{NP}(\cdot, \cdot)$ can be for example the RBF kernel (4).

The semi-parametric (SP) kernel takes advantage of the global property of the parametric kernel $k_{PI}$ as well as of the flexibility of the nonparametric kernel $k_{NP}$. Using SP kernels has been shown to have a model learning program which generalize well also to area of the state space not well explored by the data, typical behavior of model learning programs obtained with nonparametric kernels, and at the same time to have higher accuracy performance than the model learning programs obtained with parametric kernels which suffer of unmodeled dynamics.

Trajectory Optimization Using iLQG

Some embodiments of the present disclosure are based on recognition that the iLQG algorithm can be used for trajectory optimization. Given a discrete time dynamics such as (1) and a cost function, the algorithm computes local linear models and quadratic cost functions for the system along a trajectory. These linear models are then used to compute optimal control inputs and local gain matrices by iteratively solving the associated LQG problem. The cost function for controller design is a function of e, the state deviation from the target state x, and of the input saturation. As concerns the state cost, typically the "smooth-abs" function is used, given by $\ell_x(e) = \sqrt{(\|e\|_2^2 + \beta^2)} - \beta$, where $\|e\|_2^2$ is the square of the Euclidean norm of e and $\beta$ is a parameter that controls the smoothness of the function around zero. In order to account for eventual constraints on input saturation, the cosine-hyperbolic function can be used, $\ell_{u^i}(u) = \gamma^2 \cosh((u^i/\gamma) - 1)$, that ensures that the costs exponentially grow to infinity outside of the desired control volume, the parameter $\gamma$ governs this volume. This cost function is optimized by linearizing the GP models and performing backward and forward search using the iLQG algorithm.

Derivative-Free Framework for Reinforcement Learning Algorithms

In this section, a novel learning framework to model the evolution of a physical system is proposed. Several issues need to be addressed in the standard modeling approach described above. We list here the main problems to be solved by some embodiments of the present disclosure.

First, the Numerical Differentiation

The Rigid Body Dynamics of any physical system computed from physical first principles are functions of joint positions, velocities and accelerations. However, a common issue is that often joint velocities and accelerations cannot be measured and computing them by means of numerical differentiation starting from the (possibly noisy) measurements of the joint positions might severely hamper the final solution. This is a very well-known and often discussed problem and it is usually partially addressed by ad-hoc filter design. However, this requires significant user knowledge and experience in tuning the filters' parameters, and is still prone to introducing various errors and delays.

Second, the Conditional Independence Assumption

The assumption of conditional independence among the $f^i(\bar{x}_k)$ with i=1 ... d given $\bar{x}_k$ in (1) might be a very imprecise approximation of the real system's behavior, in particular when the outputs considered are position, velocity or acceleration of the same variable, which are correlated by nature. This fact is both an issue for estimation performance and an issue because one separate GP for each output needs to be estimated for modeling variables intrinsically correlated, leading to redundant modeling design and testing work, and a waste of computational resources and time. This last aspect might be particularly relevant when considering systems with a considerable number of degrees of freedom.

Third, Delays and Nonlinearities in the Dynamics

Finally, physical systems often are affected by intrinsic delays and nonlinear effects that have an impact on the system over several time instants, contradicting the first-order Markov assumption; an instance of such behavior is discussed later.

Derivative-Free State Definition

To overcome the aforementioned limitations, we define the system state in a derivative-free fashion, considering as state elements the history of the position measurements:

$$x_k := [q_k, \ldots, q_{k-k_p}] \in R^{n(k_p+1)}. \quad (6)$$

where $k_p \in R$ is a positive integer.

The definitions of the states are described as follows. In some cases, the object state data may represent a set of sequential measurement data of positions of the object in a predetermined period of time, and the robot state data may represent a set of sequential measurement data of positions of the robot in a predetermined period of time.

The definition above can be understood that when velocities and accelerations measures are not available, if $k_p$ is chosen sufficiently large, then the history of the positions contains all the system information available at time k, leaving to the model learning algorithm the possibility of estimate the state transition function. Indeed, velocities and accelerations computed through causal numerical differentiation are the outputs of digital filters with finite impulse response (or with finite past instants knowledge for nonlinear filters), which represent a statistic of the past raw position data. These statistics cannot be exact in general, and might be severely corrupted by, for example, the delay introduced when a low-pass filter is used to reject the noise, or by the compound error propagation if several filters are applied, leading to a loss of information for the learning algorithm. Instead, this loss of information is kept in the proposed derivative-free framework which is some embodiment of the present disclosure. The state transition function becomes deterministic and known (i.e., the identity function) for all the $\lfloor q_{k-1}, \ldots, q_{k-k_p} \rfloor$ components of the state. Consequently, the problem of learning the evolution of the system is restricted to learning only the functions $q_{k+1}=f(x_k, u_k)$ reducing the number of models to learn and avoiding erroneous conditional independence assumptions. Finally, the MDP has some state information rich enough to be robust to intrinsic delays and to obey the first-order Markov property.

State Transition Learning with PIDF Kernel

The proposed state definition entails the need of a modeling technique for the MDP's state transition function. Derivative-free GPRs were already introduced only for nonparametric derivative-free GPR. However, as pointed in the above, the generalization performance of data-driven models might not be sufficient to guarantee robust learning performance, and exploiting eventual prior information coining from the physical model is crucial. On the other hand, physical models depend on positions, velocities and accelerations, and their use in a derivative-free framework is not possible in the standard formulation, the embodiments of the present disclosure solve this issue. In the following the procedure to obtain the so called Physically Inspired Derivative-Free (PIDF) kernel is proposed.

Define $q_{k^-}^i = \lfloor q_k^i, \ldots, q_{k-k_p}^i \rfloor$ and assume that a physical model of the type $y_k = \varphi(q_k, \dot{q}_k, \ddot{q}_k, u_k)w$, is known. Then, we propose a set of guidelines based on $\varphi(q_k, \dot{q}_k, \ddot{q}_k, u_k)$ to derive a PIDF kernel, which is an important component of the DFSPGP model learning program.

PIDF Kernel Guidelines

Each and every position, velocity or acceleration term in $\pi(\bullet)$ is replaced by a distinct polynomial kernel $k_{poly}^p(\bullet, \bullet)$ of degree p, where p is the degree of the original term; e.g., $\ddot{q}^{i^2} \rightarrow k_{poly}^2(\bullet, \bullet)$.

The input of each of the kernels $k_{poly}^k(\bullet, \bullet)$ in 1) is a function of $q_{k^-}^i$, the history of the position $q^i$ corresponding to the independent variable of the substituted term; e.g., $\ddot{q}^{i^2} \rightarrow k_{poly}^2(q_{k^-}^i, \bullet)$.

If a state variable appears into $\varphi(\bullet)$ transformed by a function $g(\bullet)$, the input to $k_{poly}^p(\bullet, \bullet)$ becomes the input defined at point 2) transformed by the same function $g(\bullet)$, e.g., $\sin(q^i) \rightarrow k_{poly}^1(\sin(q_{k^-}^i), \sin(q_{j^-}^i \bullet))$.

Applying this guidelines will generate a kernel function $k_{PIDF}(\bullet, \bullet)$ which incorporate the information given by the physics without knowing velocity and acceleration.

The extension to semi-parametric derivative-free (SPDF) kernels become trivial when combing, as described in section "Semiparametric kernel", the proposed $k_{PIDF}(x_k, \bullet)$ with a NP kernel with derivative-free state, $k_{NPDF}(x_k, \bullet)$:

$$k_{SPDF}(x_k, x_j) = k_{PIDF}(x_k, x_j) + k_{NPDF}(x_k, x_j) \quad (7)$$

which is the DF-SPGP kernel learning program. These guidelines formalize the solution to the non-trivial issue of modeling real systems using the physical models but without measuring velocity and acceleration. In other words, the DF-SPGP Model learning program, which is defined based on the DF-SPGP kernel learning program (the DF-SPGP kernel learning program may define the DF-SPGP Model learning program), can predict behaviors of the robot and/or the object manipulated by the robot.

Features

Contemplated is that one or a combination of aspects can be included in independent claim 1 to create one or more different embodiments. For example, some of the one or a combination of aspects can include the following:

An aspect can include that wherein the HP model for the HW is previously configured to have learned different states of HW performance that correspond as a set of boundaries in the human data. Wherein the HRI model is previously configured to have learned mappings between the different states of the HW and optimal robot actions.

Another aspect is that the HW data includes data for each completed training task such as one or a combination of patterns of movements by the HW, an energy level of the HW, a skill level associated with a set of HW skill levels, and historical levels of states of the HW corresponding to a performance matrix associated with each completed training task. Such that an aspect could be some of the classifications of anomaly detections include robot actions associated with the state of the HW, that include, different levels of speed, X-axis, Y-axis and Z-axis movements of the robot, voice announcements, making calls, maintaining robot positions for one or more periods of time, adjusting environmental conditions via commands sent to a controller. Wherein some of the types of classification of anomalies also include detection of future anomalies, maintenance related anomalies, safety related anomalies, lost production anomalies, potential failure of components anomalies, quality anomalies and assembly line anomalies.

Also an aspect may be, if the no anomaly is determined, then the state of the HW is compared to a predetermined level of HW performance thresholds, and if greater than, a HW peak performance threshold, indicating a peak performance by the HW to complete the task, then, the HP model is updated to model peak performance by the HW, and wherein the level of the HW performance is determined by extracting data from the received HW signals, such as an adherence of the HW measurements to the learned statistical models, a degradation of model performance, or a specific learning model used to predict the obtained state of the HW.

Further, an aspect could be some of the previously learned boundaries of different types of anomalies and no anomalies learned from the Human data by the HP model include a HW that is no longer working, a distracted HW, a HW experiencing a level of energy indicating the HW is tired or underperforming according to the previously learned boundaries, or a HW experiencing a level of energy indicating the HW is energetic or performing at a high energy level according to the previously learned boundaries, or a HW experiencing a level of energy indicating the HW is not tired or energetic such as an average energetic level, or performing at a level of energy associated with an average HW performance according to the previously learned boundaries.

Definitions

Biometric—Biometrics is the technical term for body measurements and calculations. It refers to metrics related to human characteristics. Biometric identifiers are the distinctive, measurable characteristics used to label and describe individuals. Biometric identifiers are often categorized as physiological versus behavioral characteristics. Physiological characteristics are related to the shape of the body. Examples include, but are not limited to fingerprint, palm veins, face recognition, DNA, palm print, hand geometry, iris recognition, retina and odor/scent. Behavioral characteristics are related to the pattern of behavior of a person, including but not limited to typing rhythm, gait, and voice. Physical identifiers—Physical identifiers are, for the most part, immutable and device independent: Photo and video: If a device is equipped with a camera, it can easily be used for authentication. Facial recognition and retinal scans are two common approaches. Physiological recognition: Voice: Voice-based digital assistants and telephone-based service portals are already using voice recognition to identify users and authenticate customers. Body attributes: obtained from 3D human body model that fits the edges of the body (i.e. outline of body, the edge or line that defines or bounds a shape or object) to construct a surface of the 3D human body, i.e. via longitudinal interpolation, deformation such as scaling. The 3D body can be represented as quadrangle meshes from contours directly and define feature lines in model corresponding to sizing parameters. The body is represented with the sizing parameters that is converted into model deformation with constraints, i.e. a contour represented as its intrinsic definition, to apply energy-based deformation. For example, gathering pressure points from a human laying down or in a chair.

Behavioral identifiers—can include such aspects: Typing patterns: Everybody has a different typing style. The speed at which they type, the length of time it takes to go from one letter to another, the degree of impact on the keyboard. Physical movements: The change in place, position, or posture in relation to the environment way, movement happens only when different body systems, such as the skeletal system, cardiovascular system, neuromuscular system, and the body's energy systems, work together, i.e. someone walks are unique to an individual. The movement is carried out around a fixed axis or fulcrum and has a direction. Anatomical movements are no different. They usually involve bones or body parts moving around fixed joints relative to the main anatomical axes (sagittal, coronal, frontal, etc.) or planes parallel to them. Navigation patterns: Mouse movements and finger movements on trackpads or touch-sensitive screens are unique to individuals and relatively easy to detect with software, no additional hardware required. Engagement patterns: We all interact with technology in different ways. How we open and use apps, how low we allow our battery to get, the locations and times of day we're most likely to use our devices, the way we navigate websites, how we tilt our phones when we hold them, or even how often we check our social media accounts are all potentially unique behavioral characteristics. These behavior patterns (i.e. a recurrent way of acting by an individual or group toward a given object or in a given situation, can be used to distinguish people from bots, until the bots get better at imitating humans. And they can also be used in combination with other authentication methods, or, if the technology improves enough, as standalone security measures.

Biometric Sensors—A biometric sensor is a transducer that changes a biometric treat of a person into an electrical signal. Biometric treats mainly include biometric fingerprint reader, iris, face, voice, etc. Generally, the sensor reads or measures light, temperature, speed, electrical capacity and other types of energies. Different technologies can be applied to get this conversation using sophisticated combinations, networks of sensors and digital cameras. Every biometric device requires one type of sensor. The biometrics applications mainly include: used in a high definition camera for facial recognition or in a microphone for voice capture. Some biometrics are specially designed to scan the vein patterns under your skin. Biometric sensors or access control systems are classified into two types such as Physiological Biometrics and Behavioral Biometrics. The physiological biometrics mainly include face recognition, fingerprint, hand geometry, Iris recognition and DNA. Whereas behavioral biometrics include keystroke, signature and voice recognition.

Vital signs (also known as vitals) are a group of the four to six most important signs that indicate the status of the body's vital (life-sustaining) functions. These measurements are taken to help assess the general physical health of a person, give clues to possible diseases, and show progress toward recovery. The normal ranges for a person's vital signs vary with age, weight, gender, and overall health. There are four primary vital signs: body temperature, blood pressure, pulse (heart rate), and breathing rate (respiratory rate), often notated as BT, BP, HR, and RR. However, depending on the clinical setting, the vital signs may include other measurements called the "fifth vital sign", oxygen saturation, via pulse oximetry monitors a person's oxygen saturation ($SO_2$) though its reading of peripheral oxygen saturation ($SpO_2$).

Inertial measurement unit (IMU) is an electronic device that measures and reports a body's specific force, angular rate, and sometimes the orientation of the body, using a combination of accelerometers, gyroscopes, and sometimes magnetometers. Wherein the IMU can be measured using micro-electromechanical inertial sensors such as accelerometers (ACCs) and gyroscopes are widely adopted for the monitoring of motor activities. ACC sensors measure changes in velocity and displacement while gyroscopes measure changes in orientation such as rotational displacement, velocity, and acceleration.

An IMU is a specific type of sensor that measures angular rate, force and sometimes magnetic field. IMUs are composed of a 3-axis accelerometer and a 3-axis gyroscope, which would be considered a 6-axis IMU (X axis, Y axis, Z axis, Yaw, Pitch and Roll). They can also include an additional 3-axis magnetometer, which would be considered a 9-axis IMU. Technically, the term "IMU" refers to just the sensor, but IMUs are often paired with sensor fusion software which combines data from multiple sensors to provide measures of orientation and heading. In common usage, the term "IMU" may be used to refer to the combination of the sensor and sensor fusion software; this combination is also referred to as an AHRS (Attitude Heading Reference System). Some applications for IMUs can be applications for IMUs include determining direction in a GPS system, tracking motion in consumer electronics such as cell phones and video game remotes, or following a user's head movements in AR (augmented reality) and VR (virtual reality) systems.

Embodiments

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A process control system for detecting an anomaly in an execution of a task in a sequence of tasks in mixed human-robot processes, comprising:
   a memory configured to store data including robot data, manufacturing process (MP) data, human data, and executable models;
   an input interface configured to receive human worker (HW) signals and robot operational signals obtained from sensors;
   a hardware processor configured to
      extract from the HW signals, a task completion time, measurements relating to a state of the HW and a next predicted sequenced task, and input into a Human performance (HP) model, the HP model determines the state of the HW based on previously learned boundaries of the state of the HW, such that the state of the HW is inputted into a Human-Robot Interaction (HRI) model, to determine a classification of anomaly or no anomaly, wherein the HRI model is previously configured to have learned mappings between the different states of the HW and optimal robot actions;
      update the HRI model with the robot operation signals, the HW signals and the classified anomaly;
      determine a control action of a robot interacting with the HW or a type of an anomaly alarm using the updated HRI model and the classified anomaly; and
   an output interface to output the control action of the robot to change a robot action, or output the type of the anomaly alarm to a management system of the mixed human-robot processes, based on the updated HRI model and the classified anomaly.

2. The process control system of claim 1, wherein the HP model for the HW is previously configured to have learned different states of HW performance that correspond as a set of boundaries in the human data.

3. The process control system of claim 1, wherein the HP model is constructed from HW training signals of completed training tasks during a training phase prior to receiving the HW signals, such that the training signals includes data for each completed training task of the completed training tasks that includes a training task name, multiple training states of the HW for each completed training task, and a next sequenced training task.

4. The process control system of claim 3, wherein the HW training signals are acquired from sensors associated with the HW during a training operation before acquiring the HW signals, and the HW signals are acquired from sensors associated with the HW during an operation of the mixed human-robot processes.

5. The process control system of claim 1, wherein the HP model is constructed by a Human Task Execution (HTE) model and a model of the state of the HW, wherein the HTE model is constructed using at least one predictive model trained using HW training signals obtained during a training phase while completing a sequence of training tasks, and wherein the model of the state of the HW is constructed using at least one classification model trained using the HW training signals, such that each completed training task is associated with multiple states of the HW, and is stored in the memory.

6. The process control system of claim 5, wherein the at least one predictive model is configured to learn expected completion times for each completed task, identify or capture patterns of movements of the HW observed in sensor data obtained from sensors, and wherein at least one statistical model learning approach, includes one or more predictive model, one or more classification model, or both, and is capable of producing estimates of a completion time of an on-going task given sensor measurements of the HW while the HW is interactively working with the robot in completing at least one task.

7. The process control system of claim 5, wherein the at least one classification model is configured to learn a state of the HW from the HW signals by first determining a completed task and a next sequenced task, then uses a gaze detection algorithm to determine the state of the HW, wherein the state of the HW includes an amount of a level of focus and an amount of a level of energy of the HW at a time of completing the task.

8. The process control system of claim 5, wherein the HW training signals of the HTE model includes training data associated with tasks such that for each completed training task includes: (1) a scale of expected task completion durations corresponding with states of the HW ranging from a highest HW performance expected task completion duration at a bottom of the scale to a lowest HW performance expected task completion duration at a highest of the scale; (2) associating the scale of the expected task completion durations to types of durations thresholds, and (3) HW data for each completed training task includes data of the HW at the time of the completed training task, wherein the data of the HW at the time of the completed training task includes one or more of an age, a level of technical education, a level of higher education, a level of skill in completing the task, a number of years of employment, a height, a weight, a level of mental capacity, or a level of physical capacity including physical disabilities.

9. The process control system of claim 5, wherein the HW training signals includes training data obtained from sensors, wherein the sensors include inertial measurement sensors, biological sensors, on-human body motion sensors, external monitors in an environment the HW is completing the tasks and external motion sensors.

10. The process control system of claim 1, wherein the HW data includes data for each completed training task, wherein the data for each completed training task includes one or a combination of patterns of movements by the HW, an energy level of the HW, a skill level associated with a set of HW skill levels, and historical levels of states of the HW corresponding to a performance matrix associated with each completed training task.

11. The process control system of claim 1,
wherein the classifications of anomaly detections include robot actions associated with the state of the HW, that include, different levels of speed, X-axis, Y-axis and Z-axis movements of the robot, voice announcements, making calls, maintaining robot positions for one or more periods of time, adjusting environmental conditions via commands sent to a controller.

12. The process control system of claim 1, wherein, if the no anomaly is determined, then the state of the HW is compared to a predetermined level of HW performance thresholds, and if greater than, a HW peak performance threshold, indicating a peak performance by the HW to complete the task, then, the HP model is updated to model peak performance by the HW, and wherein the level of the HW performance is determined by extracting data from the received HW signals that include an adherence of the HW measurements to the learned statistical models, a degradation of model performance, or a specific learning model used to predict the obtained state of the HW.

13. The process control system of claim 1, wherein the previously learned boundaries of different types of anomalies and no anomalies learned from the Human data by the HP model include a HW that is no longer working, a distracted HW, a HW experiencing a level of energy indicating the HW is tired or underperforming according to the previously learned boundaries, or a HW experiencing a level of energy indicating the HW is energetic or performing at a high energy level according to the previously learned boundaries, or a HW experiencing a level of energy indicating the HW is not tired or energetic.

14. The process control system of claim 1, wherein the HP model is constructed by a Human Task Execution (HTE) model and a model of the state of the HW, wherein the HTE model is constructed using at least one predictive model trained using HW training signals obtained during a training phase while completing a sequence of training tasks,
wherein the model of the state of the HW is constructed using at least one classification model trained using the HW training signals, such that each completed training task is associated with multiple states of the HW, and is stored in the memory,
wherein the at least one predictive model is configured to learn expected completion times for each completed task, identify or capture patterns of movements of the HW observed in sensor data obtained from sensors, and wherein at least one statistical model learning approach, includes one or more predictive model, one or more classification model, or both, and is capable of producing estimates of a completion time of an on-going task given sensor measurements of the HW while the HW is interactively working with the robot in completing at least one task,
wherein the at least one classification model is configured to learn a state of the HW from the HW signals by first determining a completed task and a next sequenced task, then uses a gaze detection algorithm to determine the state of the HW, wherein the state of the HW includes an amount of a level of focus and an amount of a level of energy of the HW at a time of completing the task.

15. A process control method for detecting an anomaly in an execution of a task in a sequence of tasks in mixed human-robot processes, comprising:
acquiring human-worker (HW) signals and robot operational signals from sensors;
extracting from the HW signals, a task completion time, measurements relating to a state of the HW and a next sequenced task, and input into a Human Performance (HP) model, to obtain a state of the HW based on previously learned boundaries of the state of the HW, the state of the HW is then inputted into a Human-Robot Interaction (HRI) model, to determine a classification of an anomaly or no anomaly, wherein the HRI model is previously configured to have learned mappings between the different states of the HW and optimal robot actions;
updating the HRI model with the robot operation signals, the HW signals and the classified anomaly, then determine a control action of a robot interacting with the HW or a type of an anomaly alarm using the updated HRI model and the classified anomaly; and
outputting the control action of the robot to change a robot action or output the type of the anomaly alarm to a management system of the mixed human-robot processes, based on the updated HRI model and the classified anomaly, wherein the steps are implemented by a hardware processor connected to a memory.

16. The method of claim 15, wherein the type of anomaly alarm includes one or a combination of a suspect assembly line mechanical failure, a suspect material supply problem to the assembly line, an under production problem due to the HW, a suspect robot related problem, an operator related task or a suspect electronic failure.

17. The method of claim 15, wherein the HP model is constructed by a Human Task Execution (HTE) model and a model of the state of the HW, wherein the HTE model is constructed using at least one predictive model trained using HW training signals obtained during a training phase while completing a sequence of training tasks, and wherein the model of the state of the HW is constructed using at least one classification model trained using the HW training signals, such that each completed training task is associated with multiple states of the HW, and is stored in the memory.

18. The method of claim 17, wherein the at least one predictive model is configured to learn expected completion times for each completed task, identify or capture patterns of movements of the HW observed in sensor data obtained from sensors, and wherein at least one statistical model learning approach, includes one or more predictive model, one or more classification model, or both, and is capable of producing estimates of a completion time of an on-going task given sensor measurements of the HW while the HW is interactively working with the robot in completing at least one task.

19. The method of claim 15, wherein the at least one classification model is configured to learn a state of the HW from the HW signals by first determining a task completed and a next sequenced task, then uses a gaze detection algorithm to determine the state of the HW, wherein the state of the HW includes an amount of a level of focus and an amount of a level of energy of the HW at a time of completing the task.

20. A non-transitory computer readable storage medium embodied thereon a program executable by a computer for performing a process control method, the process control method for detecting an anomaly in an execution of a task in a sequence of tasks in mixed human-robot processes, the process control method comprising steps of:

acquiring human worker (HW) signals and robot operational signals from sensors;

extracting from the HW signals, a task completion time, measurements relating to a state of the HW and a next sequenced task, and input into a Human Performance (HP) model, to obtain a state of the HW performance based on previously learned boundaries of the state of the HW, the state of the HW performance is then inputted into a Human-Robot Interaction (HRI) model, to determine a classification of anomaly or no anomaly, wherein the HRI model is previously configured to have learned mappings between the different states of the HW and optimal robot actions;

updating the HRI model with the robot operation signals, the HW signals and the classified anomaly, then determine a control action of a robot interacting with the HW or a type of an anomaly alarm using the updated HRI model and the classified anomaly; and outputting the control action of the robot to change a robot action or output the type of the anomaly alarm to a management system of the mixed human-robot processes, based on the updated HRI model and the classified anomaly, wherein the steps of the process control method are implemented using a hardware processor connected to a memory.

* * * * *